United States Patent
Takigawa et al.

(10) Patent No.: US 9,946,030 B1
(45) Date of Patent: Apr. 17, 2018

(54) BEAM BRANCHING DEVICE

(71) Applicant: FANUC CORPORATION, Yamanashi (JP)

(72) Inventors: Hiroshi Takigawa, Yamanashi (JP); Munekazu Matsuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/786,633

(22) Filed: Oct. 18, 2017

(30) Foreign Application Priority Data

Oct. 19, 2016 (JP) ................................. 2016-205258

(51) Int. Cl.
| | |
|---|---|
| G02B 6/26 | (2006.01) |
| B23K 26/00 | (2014.01) |
| G02B 6/35 | (2006.01) |
| B23K 26/067 | (2006.01) |
| G02B 26/08 | (2006.01) |

(52) U.S. Cl.
CPC .......... G02B 6/3512 (2013.01); B23K 26/067 (2013.01); G02B 6/352 (2013.01); G02B 6/354 (2013.01); G02B 6/3514 (2013.01); G02B 26/08 (2013.01)

(58) Field of Classification Search
CPC .... G02B 6/351; G02B 6/3512; G02B 6/3514; G02B 6/352; G02B 6/354; G02B 6/42; G02B 26/08; B23K 26/067; B23K 26/08; B23K 26/082; B23K 26/0821
USPC ............. 385/16–23, 47; 219/121.61, 121.62, 219/121.63
See application file for complete search history.

(56) References Cited

U.S. PATENT DOCUMENTS

| | | | | |
|---|---|---|---|---|
| 5,268,975 A | * | 12/1993 | Yoshitani | ............. B23K 26/067 385/16 |
| 6,300,593 B1 | * | 10/2001 | Powell | ............... B23K 26/0846 219/121.67 |
| 2004/0218637 A1 | | 11/2004 | Sakano et al. | |

FOREIGN PATENT DOCUMENTS

| | | |
|---|---|---|
| JP | S53-143247 A | 12/1978 |
| JP | S61-151607 A | 7/1986 |
| JP | 2000-180741 A | 6/2000 |
| JP | 2004-281888 A | 10/2004 |

(Continued)

*Primary Examiner* — Akm Enayet Ullah
*Assistant Examiner* — Michael Mooney
(74) *Attorney, Agent, or Firm* — Studebaker & Brackett PC

(57) ABSTRACT

A beam branching device capable of suppressing an increase in the cost and the like even when the number of branching directions of an incident beam is large and increasing the coupling efficiency even when the rotation accuracy of a rotary motor is not increased too high and coping with high-speed switching of the optical path is provided. In a beam branching device, a rotation shaft of a rotary motor is rotated to rotate a rotating member together with a plurality of reflection mirrors so that an incident beam is reflected from a reflection mirror surface portion of any one of the plurality of reflection mirrors and the incident beam is branched to a plurality of directions to switch an optical path of a reflection beam. A central axis of the rotating member is at a skewed position in relation to a central line of the incident beam, and the plurality of reflection mirrors are arranged at a position on the rotating member to face both sides in an axial direction of the rotating member with a position closest to the incident beam interposed therebetween.

11 Claims, 27 Drawing Sheets

(56) References Cited

FOREIGN PATENT DOCUMENTS

JP 2014-065047 A 4/2014

* cited by examiner

-- Prior Art --

-- Prior Art --

-- Prior Art --

BEAM BRANCHING DEVICE

This application is based on and claims the benefit of priority from Japanese Patent Application No. 2016-205258, filed on 19 Oct. 2016, the content of which is incorporated herein by reference.

BACKGROUND OF THE INVENTION

Field of the Invention

The present invention relates to a beam branching device for branching a laser beam which has been emitted from a laser apparatus, for example, and which has propagated through an optical fiber (a feed fiber) that supplies the laser beam into a plurality of machining optical fibers (process fibers) and supplying the laser beam to machining heads.

Related Art

Conventionally, when laser machining such as welding by a robot hand that grasps a machining head that emits a laser beam is performed, a laser beam having propagated through a feed fiber from a laser apparatus is switchably branched into a plurality of process fibers using a beam branching device, and laser machining is performed by a plurality of machining heads connected to the other ends of the respective process fibers. In this way, one laser apparatus is used efficiently.

As a technique related to this beam branching device, a technique (hereinafter referred to as Related Art 1) of attaching a reflection mirror surface portion of a reflection mirror perpendicularly to a rotating member that is rotated by a rotary motor in order to enhance the coupling efficiency (the proportion of light energy propagating from a feed fiber through a process fiber via the beam branching device, and specifically a value obtained by dividing light energy exiting from a core portion of an exit-side end surface of a feed fiber by light energy incident on a core portion of an incidence-side end surface of a process fiber) is proposed (for example, see Patent Documents 1, 2, and 3).

That is, in Related Art 1, as illustrated in FIG. 17, a plurality of (two in FIG. 17) optical-path-switching optical systems 30 each including a reflection mirror 5, a rotating member 4, and a rotary motor 2 is provided. In each optical-path-switching optical system 30, the position of the reflection mirror 5 is changed according to rotation of the rotating member 4 directly connected to a rotation shaft of the rotary motor 2 so that an incident beam 7 is branched into two directions that the incident beam 7 is irradiated to and reflected from the reflection mirror 5 and the incident beam 7 is not irradiated to the reflection mirror 5 but travels in a straight line. In this way, the incident beam 7 can be branched into three or more directions (in FIG. 17, three directions in total, two process fibers 12 and one absorber 17). Here, since a reflection mirror surface portion 20 of the reflection mirror 5 of each optical-path-switching optical system 30 is perpendicular to the rotating member 4, the position and the direction of a reflection beam 9 do not change even if a rotation angle of the reflection mirror 5 is shifted a little. Therefore, it is possible to obtain high coupling efficiency even when a core diameter of the end surface of the process fiber 12 is as small as approximately 100 μm.

As another technique other than Related Art 1, a technique (hereinafter referred to as Related Art 2) in which a plurality of reflection mirror surface portions 20 having different inclinations in a radial direction of the rotation shaft of the rotary motor 2 are formed in the reflection mirror 5 in order to suppress an increase in the cost, the size, and the weight of a beam branching device so that the incident beam 7 is branched into a large number of directions using only one rotary motor 2 is proposed (for example, Patent Documents 4 and 5).

That is, in Related Art 2, as illustrated in FIG. 18B, a plurality of (three in FIG. 18) reflection mirror surface portions 20 are formed in the reflection mirror 5, and these reflection mirror surface portions 20 have different inclinations in the radial direction of the rotation shaft of the rotary motor 2. By rotating the reflection mirror 5 appropriately according to the direction of the reflection beam 9, it is possible to branch the incident beam 7 into a plurality of directions as illustrated in FIG. 18A.

Patent Document 1: Japanese Unexamined Patent Application, Publication No. 2004-281888
Patent Document 2: Japanese Unexamined Patent Application, Publication No. 2000-180741
Patent Document 3: Japanese Unexamined Patent Application, Publication No. 2014-65047
Patent Document 4: Japanese Unexamined Patent Application, Publication No. S53-143247
Patent Document 5: Japanese Unexamined Patent Application, Publication No. S61-151607

SUMMARY OF THE INVENTION

However, in Related Art 1, the coupling efficiency of the beam branching device can be enhanced even when the rotation accuracy of the rotary motor 2 is not high enough. However, a number of rotary motors 2 corresponding to the number of branching directions of the incident beam 7 are necessary. Therefore, an increase in the number of branching directions of the incident beam 7 results in an increase in the cost, the size, and the weight of the beam branching device.

Unlike Related Art 1, in Related Art 2, since only one rotary motor 2 is necessary even when the number of branching directions of the incident beam 7 is large, it is possible to suppress an increase in the cost, the size, and the like of the beam branching device. However, since the direction of the reflection beam 9 changes greatly if the rotation angle of the rotary motor 2 changes a little, the coupling efficiency of the beam branching device decreases unless the rotation angle of the rotary motor 2 is controlled with high accuracy. Furthermore, since the reflection mirror 5 driven by the rotary motor 2 has inertia, the coupling efficiency decreases further in a period until the reflection mirror 5 stops completely. Therefore, considering the fact that certain coupling efficiency is to be secured when the beam branching device is used in practice, it can be said that it is substantially impossible to switch an optical path at a high speed.

As described above, in the conventional technique (Related Arts 1 and 2), it is not possible to satisfy both suppression of an increase in the cost, the size, and the like of the beam branching device even when the number of branching directions of the incident beam 7 is large and a decrease in the coupling efficiency of the beam branching device to cope with high-speed switching of an optical path even when the rotation accuracy of the rotary motor 2 is not increased too high.

Therefore, an object of the present invention is to provide a beam branching device capable of satisfying both, that is, suppression of an increase in the cost, the size, and the like of the beam branching device even when the number of branching directions of the incident beam 7 is large and a decrease in the coupling efficiency of the beam branching device to cope with high-speed switching of an optical path even when the rotation accuracy of the rotary motor 2 is not increased too high.

(1) A beam branching device (for example, a beam branching device 1, 21, 31, 41, 51 to be described later) includes: a rotary motor (for example, a rotary motor 2 to be described later); a rotating member (for example, a rotating member 4 to be described later) that rotates with a rotation shaft of the rotary motor; and an optical-path-switching optical system (for example, an optical-path-switching optical system 30 to be described later) including a plurality of reflection mirrors (for example, a reflection mirror 5 to be described later) attached to the rotating member so as to be spaced in an axial direction of the rotating member, the reflection mirror having a reflection mirror surface portion (for example, a reflection mirror surface portion 20 to be described later) that is approximately perpendicular to a central axis (for example, a central axis 6 to be described later) of the rotating member, wherein the rotation shaft of the rotary motor is rotated to rotate the rotating member together with the plurality of reflection mirrors so that an incident beam is reflected from the reflection mirror surface portion of any one of the plurality of reflection mirrors and the incident beam is branched to a plurality of directions to switch an optical path of a reflection beam, and the optical-path-switching optical system is arranged so that the central axis of the rotating member is at a skewed position in relation to a central line of the incident beam, and the plurality of reflection mirrors are arranged at a position on the rotating member to face both sides in an axial direction of the rotating member with a position closest to the incident beam interposed therebetween.

(2) In the beam branching device according to (1), the optical-path-switching optical system may be configured so that, when the plurality of reflection mirrors are positioned at predetermined angular positions by rotation of the rotating member, substantially the entire incident beam is reflected from the reflection mirror surface portion of any one of these reflection mirrors.

(3) In the beam branching device according to (1) or (2), when the central line of the incident beam is virtually moved along a direction parallel to a shortest segment that connects the central axis of the rotating member and the central line of the incident beam so as to intersect the central axis of the rotating member, a virtual intersection angle between the central axis of the rotating member and the central line of the incident beam may be approximately 45°.

(4) In the beam branching device according to (3), each of the reflection mirror surface portions of the reflection mirrors is formed in an elliptical shape or a polygonal shape including the elliptical shape of which the major axis is approximately identical to the line of intersection of an incidence plane and a reflection plane of the incident beam when the incident beam is reflected from the reflection mirror surface portion and of which the ellipticity is approximately $\sqrt{2}$.

(5) In the beam branching device according to any one of (1) to (4), the optical-path-switching optical system may be configured so that, even when the incident beam is reflected from the reflection mirror surface portion of any one of the plurality of reflection mirrors, the optical paths of the incident beam and the reflection beam are not interfered with the other reflection mirrors.

(6) In the beam branching device according to any one of (1) to (5), the optical-path-switching optical system may be configured so that the incident beam travels in a straight line without being reflected from any reflection mirror surface portion of the plurality of reflection mirrors by rotating the rotating member appropriately.

(7) In the beam branching device according to any one of (1) to (6), the optical-path-switching optical system may be configured so that in a period in which an arbitrary reflection mirror among the plurality of reflection mirrors is switched to the other arbitrary reflection mirror, the other reflection mirrors do not reflect the incident beam.

(8) In the beam branching device according to any one of (1) to (7), the plurality of reflection mirrors may be configured so that the incident beam is not irradiated to a portion other than the reflection mirror surface portion regardless of a rotation angle of the rotating member.

(9) In the beam branching device according to any one of (1) to (8), the optical-path-switching optical system may be configured so that the center of gravity of all constituent members that are rotated by the rotary motor is substantially on the central axis of the rotating member.

(10) In the beam branching device according to any one of (1) to (9), a plurality of optical-path-switching optical systems may be provided along an optical path of the incident beam.

(11) In the beam branching device according to any one of (1) to (10), the optical-path-switching optical system may be configured so that a rotation angle of the rotating member is controlled on the basis of a command from a numerical controller that controls a laser apparatus that emits the incident beam or a numerical controller that controls a machining head that irradiates the incident reflection beam to a machining workpiece.

According to the present invention, since one rotary motor includes a plurality of reflection mirrors, it is possible to suppress an increase in the cost, the size, and the like even when the number of branching directions of the incident beam is large. Moreover, since the reflection mirror surface portion of the reflection mirror is approximately perpendicular to the central axis of the rotating member, it is possible to increase the coupling efficiency even when the rotation accuracy of the rotary motor is not increased too high and to cope with high-speed switching of the optical path.

Furthermore, since the central axis of the rotating member that supports the plurality of reflection mirrors and the central line of the incident beam are at skewed positions in relation to each other and a novel design is applied to arrangement of these reflection mirrors, it is possible to reduce the size and the weight of the optical-path-switching optical system and the beam branching device.

BRIEF DESCRIPTION OF THE DRAWINGS

FIG. 3A is seen from a Z-direction (the rotation axis direction).

FIG. 3A is seen from a Y-direction.

FIG. 3A is seen from an X-direction.

FIG. 4A is seen from a Z-direction (the rotation axis direction).

FIG. 4A is seen from a Y-direction.

FIG. 4A is seen from an X-direction.

FIG. 5A is seen from a Z-direction (the rotation axis direction).

FIG. 5A is seen from a Y-direction.

FIG. 5A is seen from an X-direction.

FIG. 6A is seen from a Z-direction (the rotation axis direction).

FIG. 6A is seen from a Y-direction.

FIG. 6A is seen from an X-direction.

FIG. 7A is seen from a Z-direction (the rotation axis direction).

FIG. 7A is seen from a Y-direction.

FIG. 7A is seen from an X-direction.

FIG. 11A is seen from a Z-direction (the rotation axis direction).

FIG. 11A is seen from a Y-direction.

FIG. 11A is seen from an X-direction.

FIG. 12A is seen from a Z-direction (the rotation axis direction).

FIG. 12A is seen from a Y-direction.

FIG. 12A is seen from an X-direction.

FIG. 13A is seen from a Z-direction (the rotation axis direction).

FIG. 13A is seen from a Y-direction.

FIG. 13A is seen from an X-direction.

FIG. 14A is seen from a Z-direction (the rotation axis direction).

FIG. 14A is seen from a Y-direction.

FIG. 14A is seen from an X-direction.

DETAILED DESCRIPTION OF THE INVENTION

Figure 1:
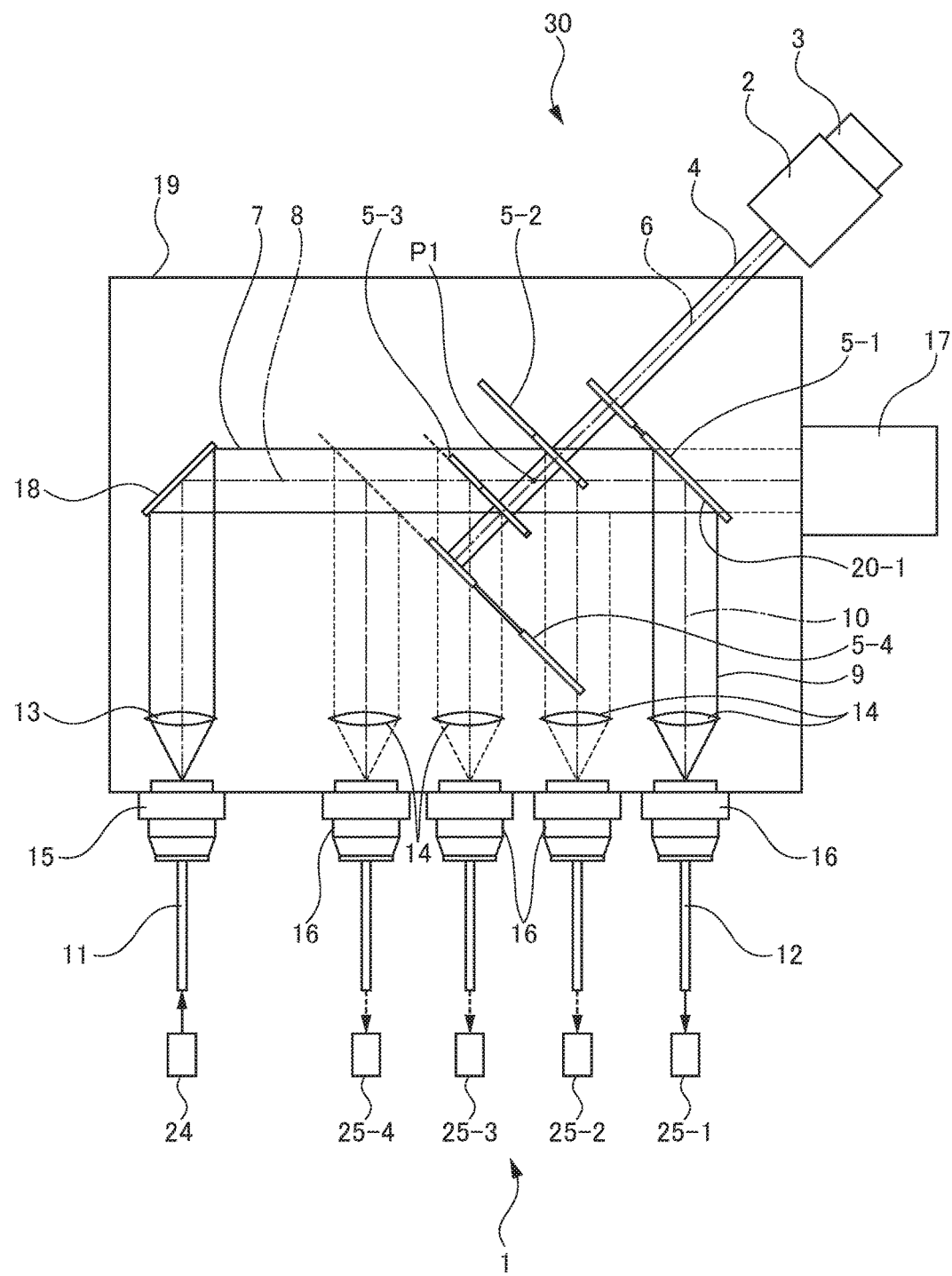
FIG. 1 is a diagram illustrating a configuration of a beam branching device according to a first embodiment.

Hereinafter, a first embodiment of the present invention will be described with reference to the drawings. In the description of the second and subsequent embodiments, the same components as those of the first embodiment will be denoted by the same reference numerals, and the description thereof will be omitted.

First Embodiment

Figure 2:
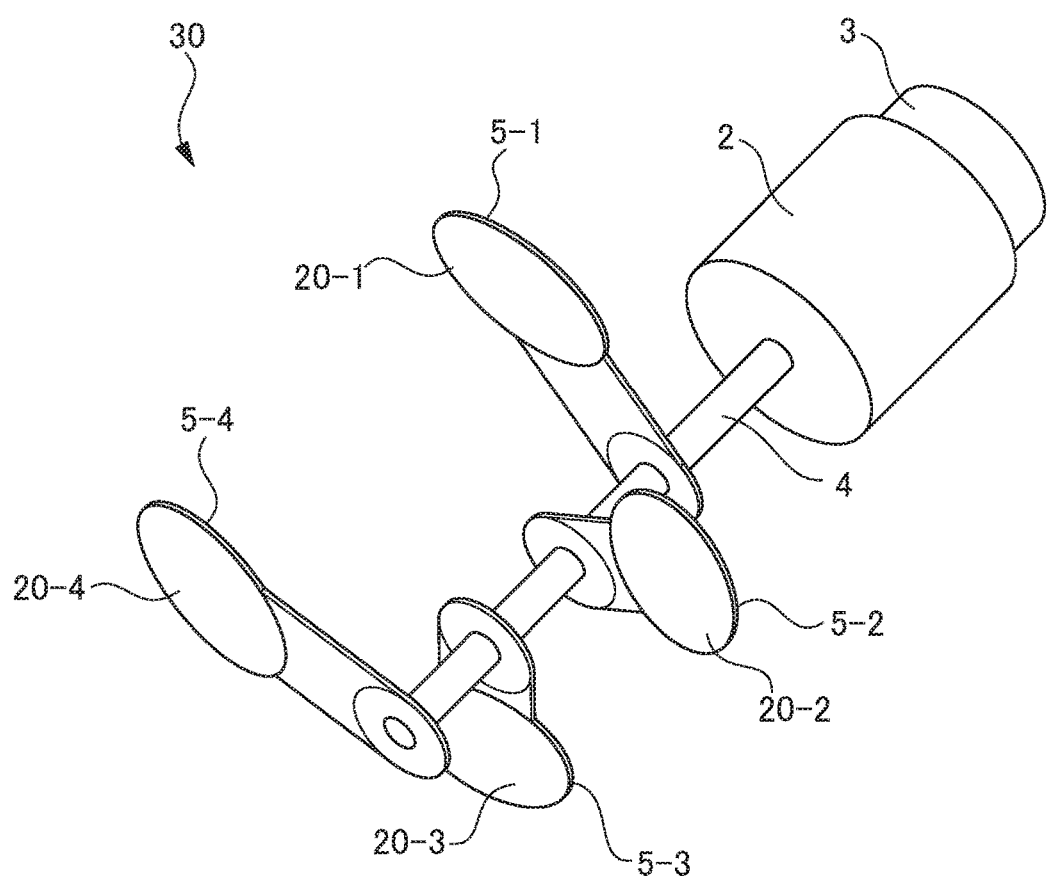
FIG. 2 is a perspective view illustrating an optical-path-switching optical system of the beam branching device according to the first embodiment.
Figure 3A:
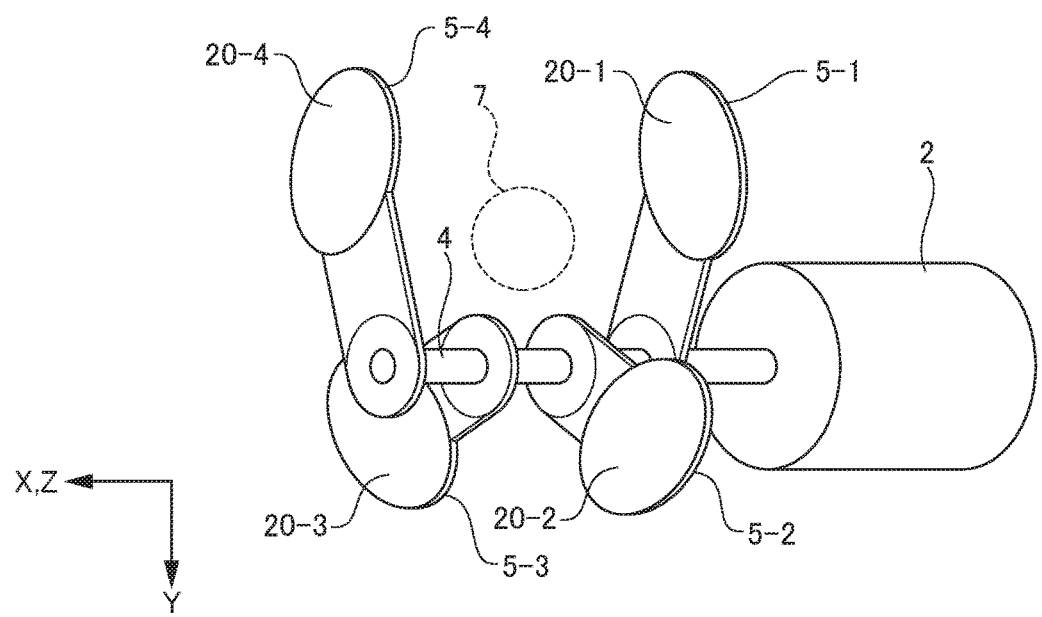
FIG. 3A is a view when an optical-path-switching optical system is seen from an incidence direction of an incident beam when the incident beam travels in a straight line without being reflected from any reflection mirror in the beam branching device according to the first embodiment.
Figure 3B:
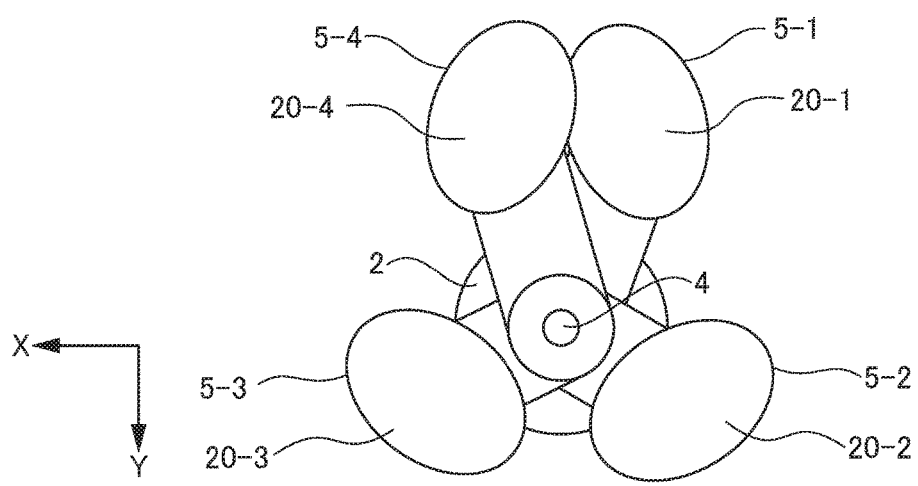
FIG. 3B is a view when
Figure 3C:
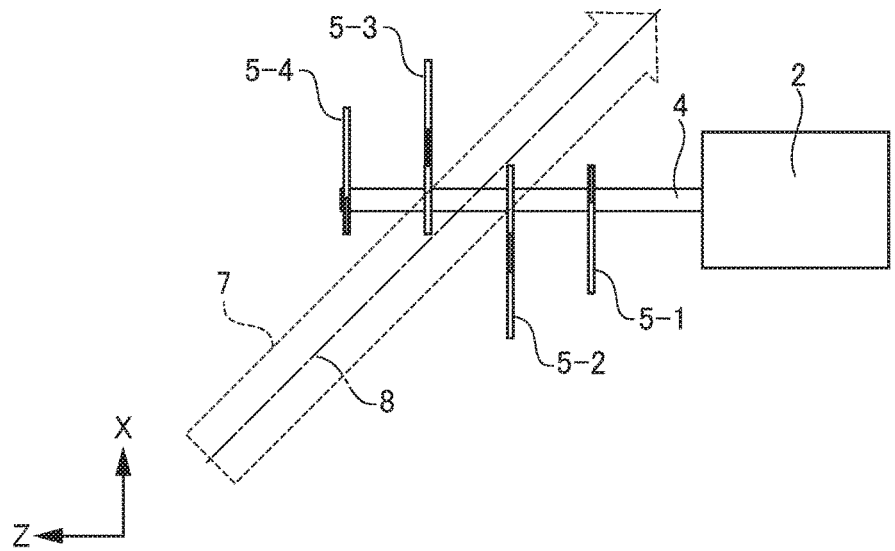
FIG. 3C is a view when
Figure 3D:
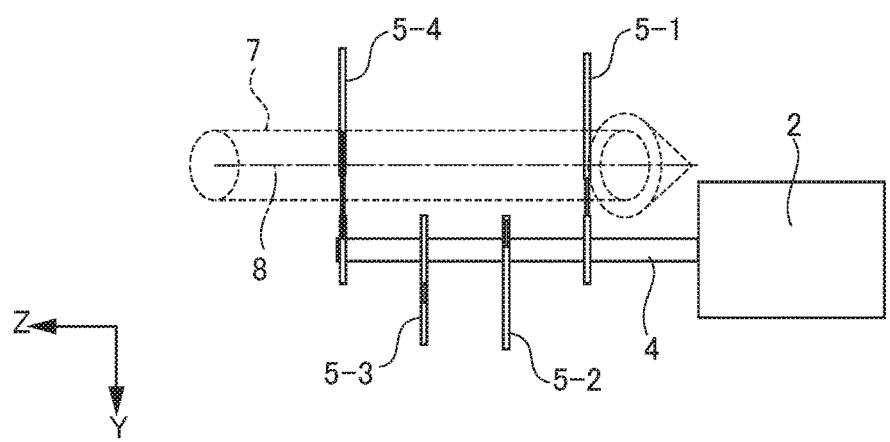
FIG. 3D is a view when
Figure 4A:
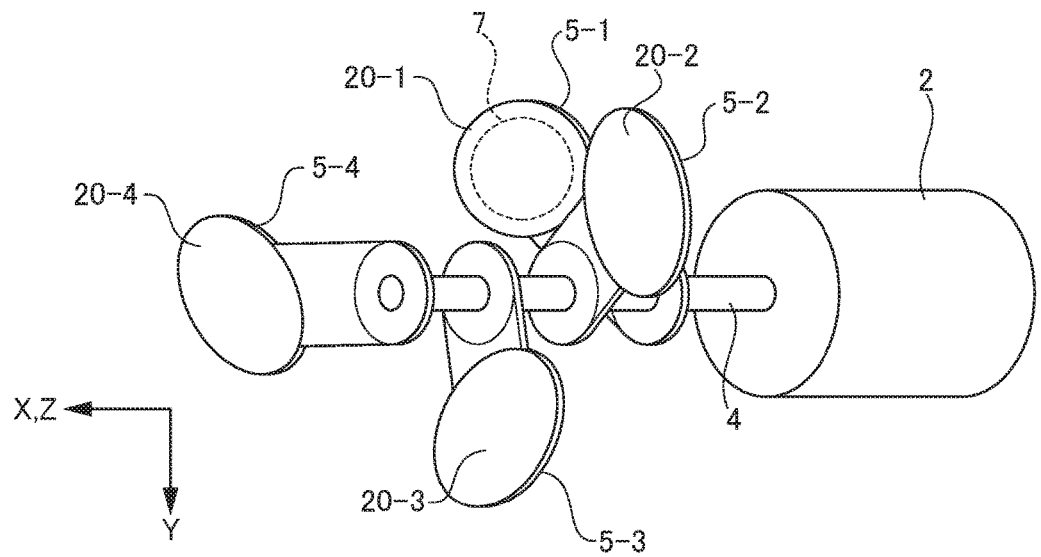
FIG. 4A is a view when an optical-path-switching optical system is seen from an incidence direction of an incident beam when the incident beam is reflected from a first reflection mirror in the beam branching device according to the first embodiment.
Figure 4B:
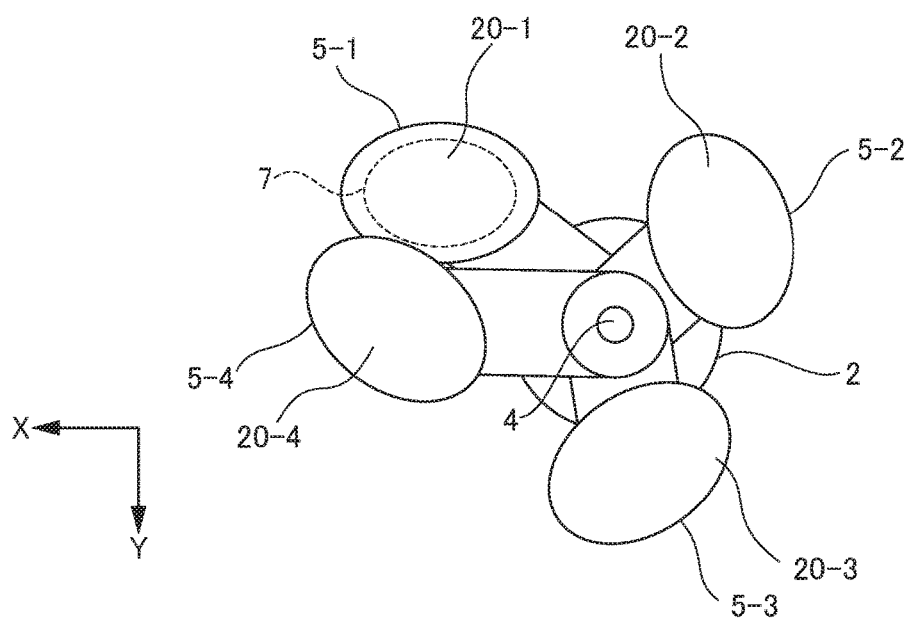
FIG. 4B is a view when
Figure 4C:
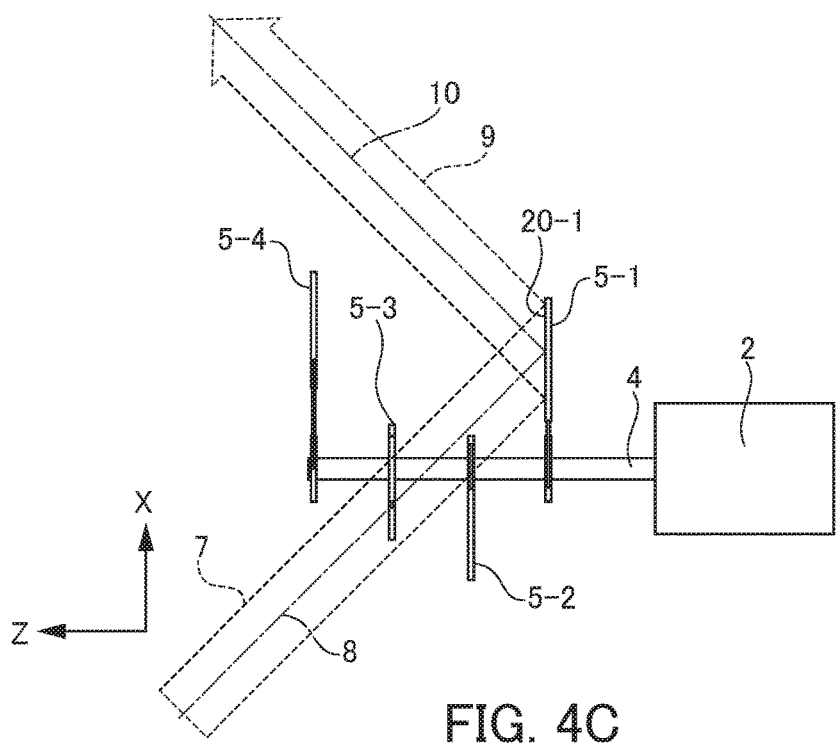
FIG. 4C is a view when
Figure 4D:
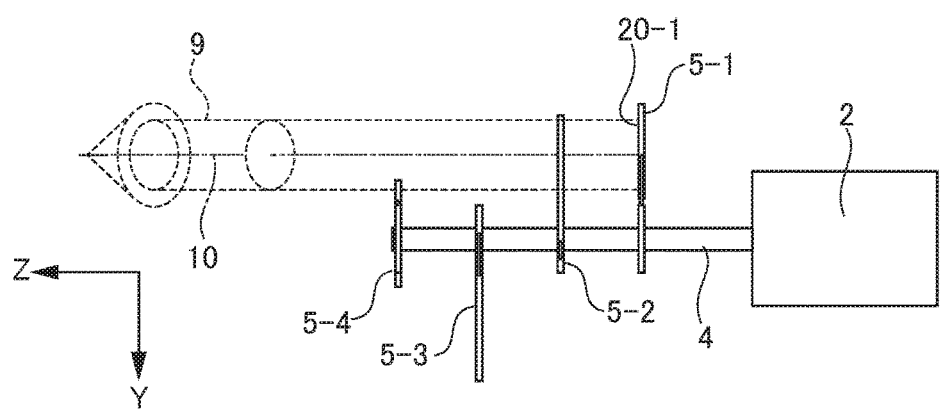
FIG. 4D is a view when
Figure 5A:
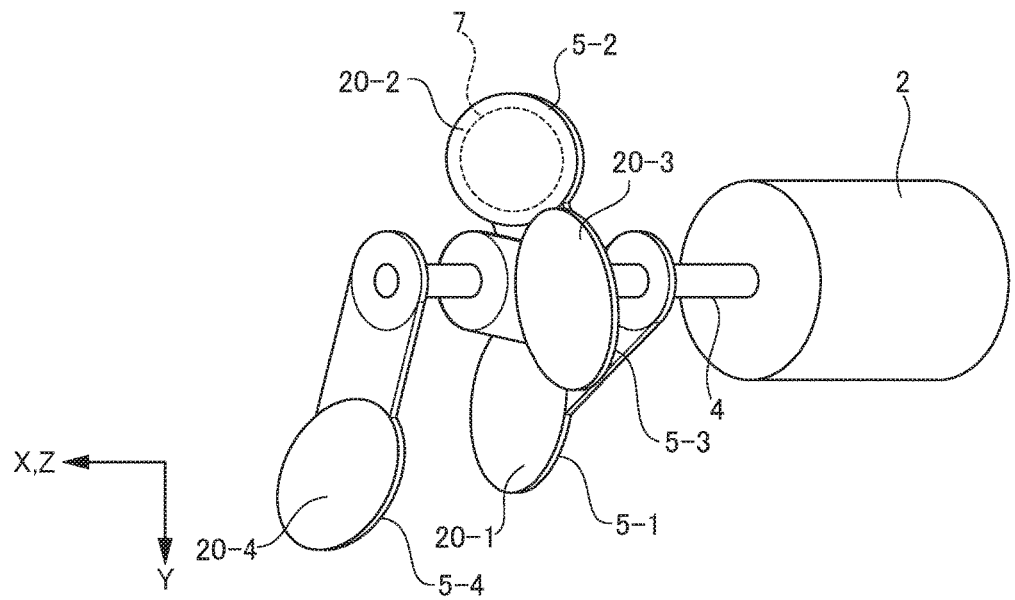
FIG. 5A is a view when an optical-path-switching optical system is seen from an incidence direction of an incident beam when the incident beam is reflected from a second reflection mirror in the beam branching device according to the first embodiment.
Figure 5B:
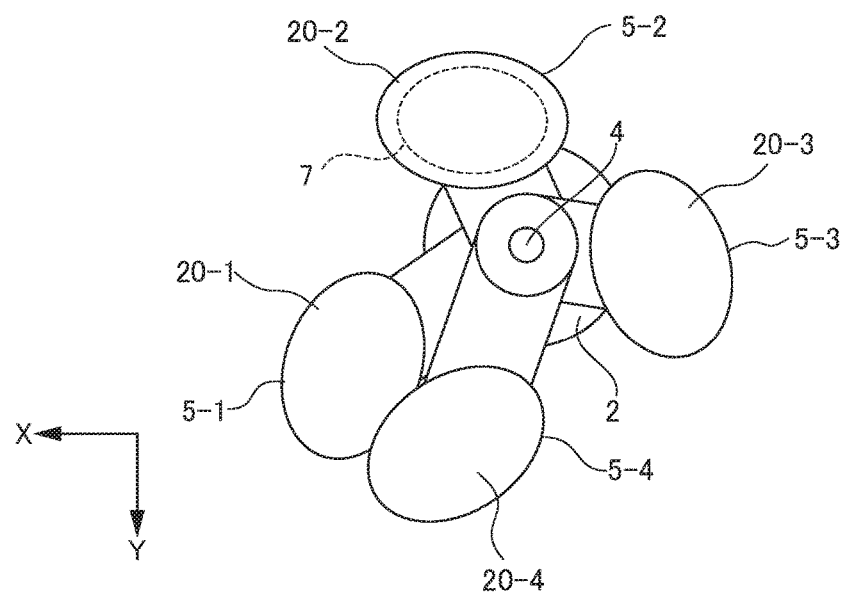
FIG. 5B is a view when
Figure 5C:
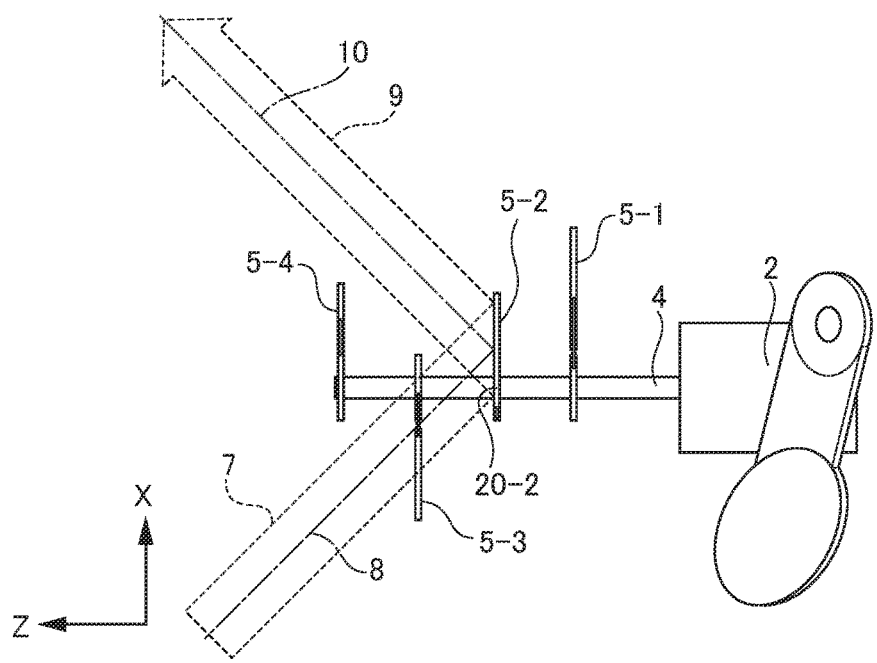
FIG. 5C is a view when
Figure 5D:
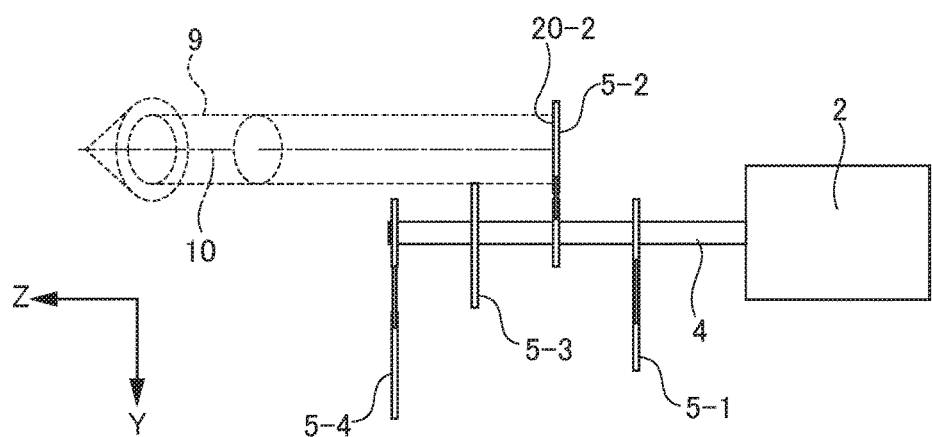
FIG. 5D is a view when
Figure 6A:
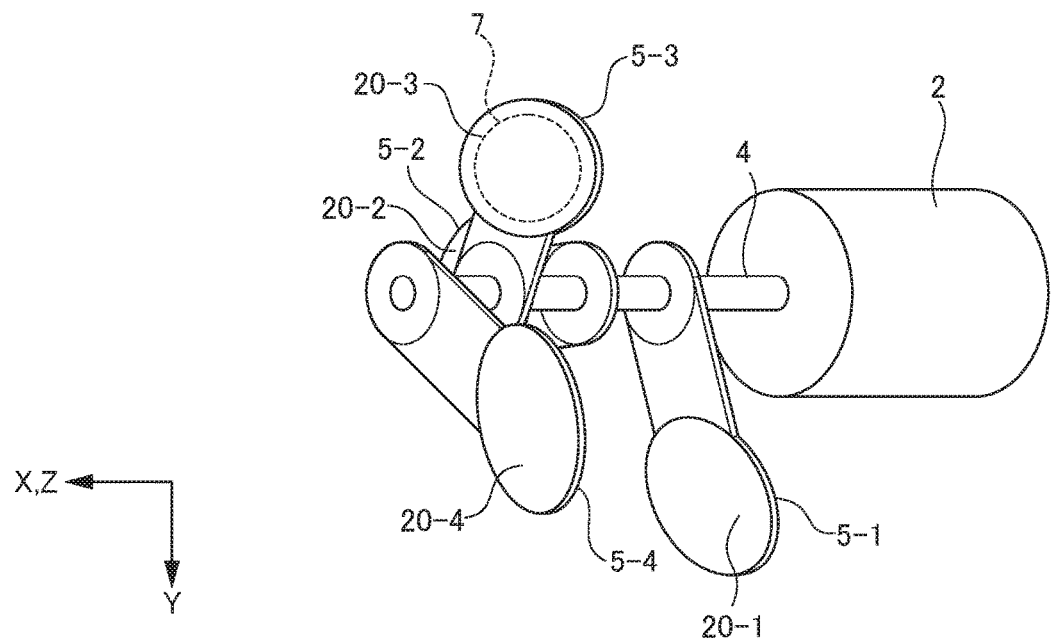
FIG. 6A is a view when an optical-path-switching optical system is seen from an incidence direction of an incident beam when the incident beam is reflected from a third reflection mirror in the beam branching device according to the first embodiment.
Figure 6B:
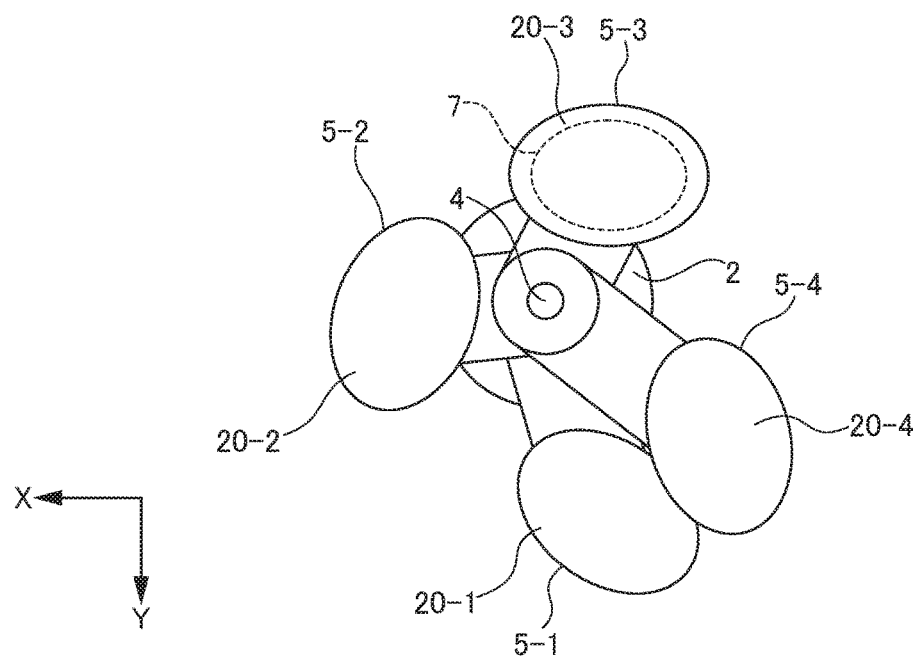
FIG. 6B is a view when
Figure 6C:
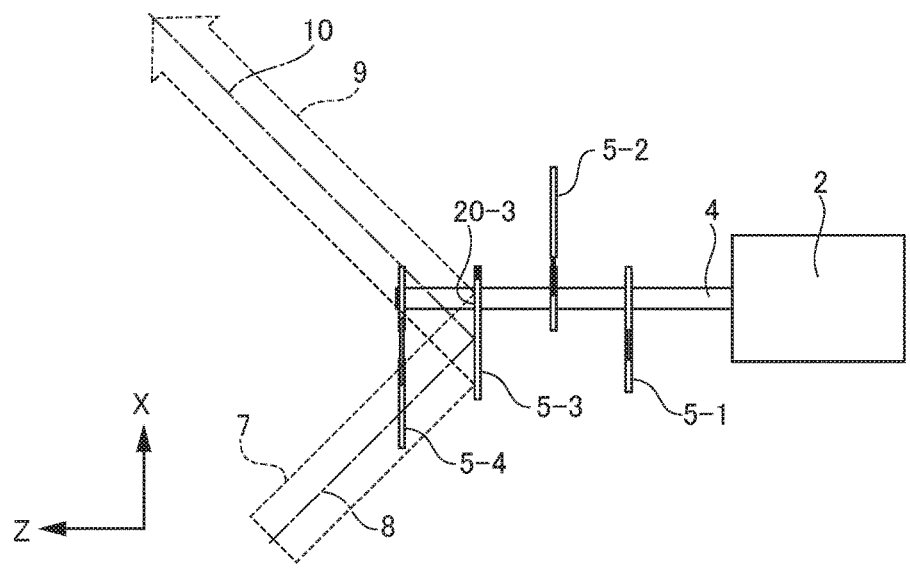
FIG. 6C is a view when
Figure 6D:
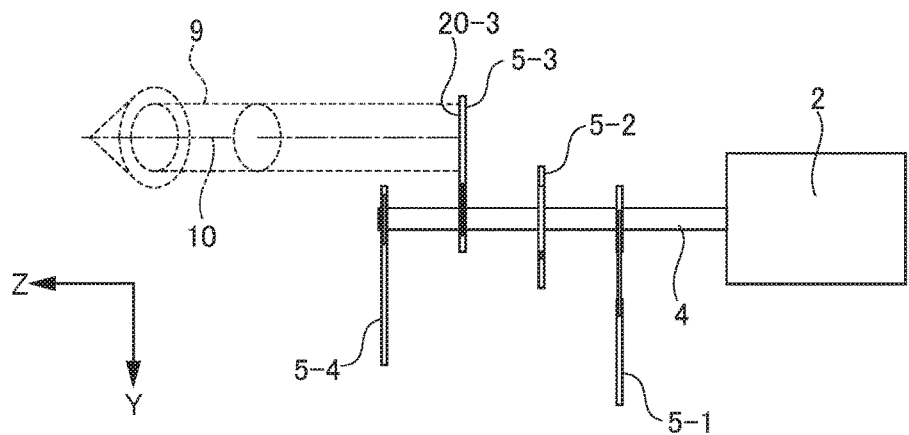
FIG. 6D is a view when
Figure 7A:
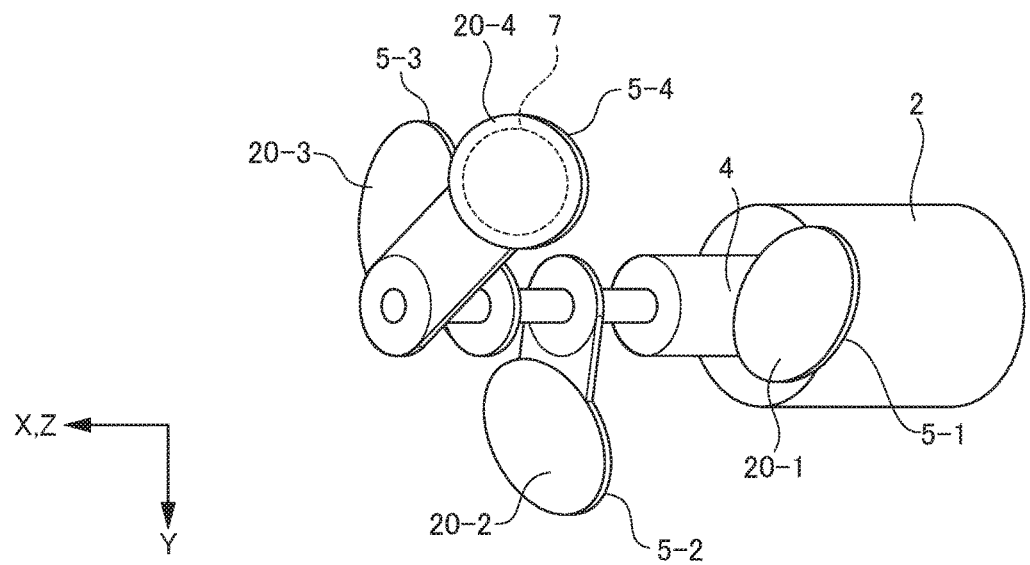
FIG. 7A is a view when an optical-path-switching optical system is seen from an incidence direction of an incident beam when the incident beam is reflected from a fourth reflection mirror in the beam branching device according to the first embodiment.
Figure 7B:
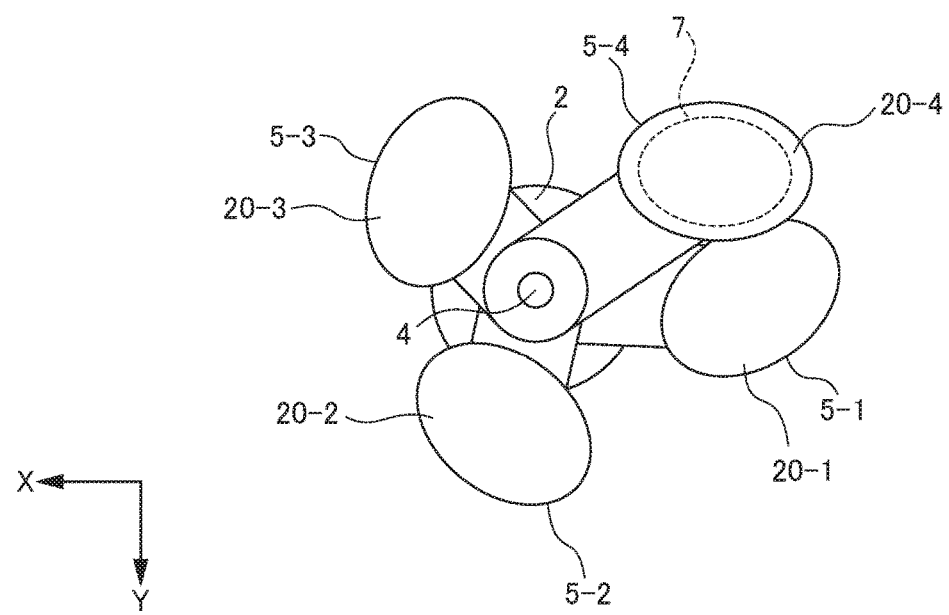
FIG. 7B is a view when
Figure 7C:
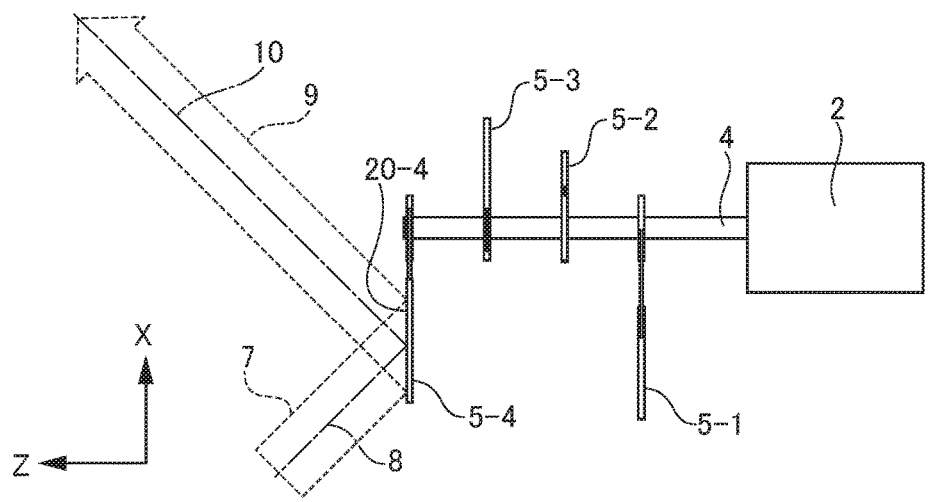
FIG. 7C is a view when
Figure 7D:
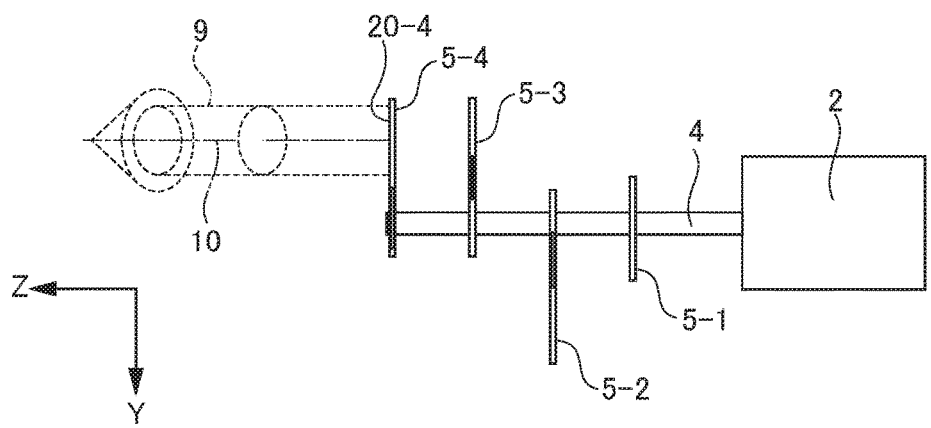
FIG. 7D is a view when

FIG. 1 is a diagram illustrating a configuration of a beam branching device according to a first embodiment of the present invention. FIG. 2 is a perspective view illustrating an optical-path-switching optical system of the beam branching device according to the first embodiment of the present invention.

As illustrated in FIGS. 1 and 2, a beam branching device 1 branches a laser beam emitted from a laser apparatus 24 into a plurality of (in the present embodiment, five) directions and supplies the laser beam to a plurality of (in the present embodiment, four) machining heads 25 (first, second, third, and fourth machining heads 25-1, 25-2, 25-3, and 25-4). This beam branching device 1 has one optical-path-switching optical system 30, and this optical-path-switching optical system 30 includes a rotary motor 2, a cylindrical rotating member 4, a plurality of (in the present embodiment, four) reflection mirrors 5 (first, second, third, and fourth reflection mirrors 5-1, 5-2, 5-3, and 5-4), and an angle sensor 3.

Here, the rotating member 4 is directly connected to a rotation shaft of the rotary motor 2 and rotates with the rotation shaft. The respective reflection mirrors 5 are attached to the rotating member 4 to be spaced from each other in an axial direction of the rotating member 4 and have reflection mirror surface portions 20 (20-1, 20-2, 20-3, and 20-4) which are approximately perpendicular to a central axis 6 of the rotating member 4. In these reflection mirrors 5, the reflection mirror surface portions 20 are arranged at different angles about the central axis 6 of the rotating member 4, and the reflection mirror surface portions 20 are parallel to each other at the same interval in the axial direction of the central axis 6 of the rotating member 4. The angle sensor 3 detects a rotation angle of the rotation shaft of the rotary motor 2.

More specifically, the beam branching device 1 has a hexagonal housing 19. One connector 15 for input fibers and four connectors 16 for output fibers are attached to a front surface (the lower surface in FIG. 1) of the housing 19. A feed fiber 11 for allowing a laser beam to propagate from the laser apparatus 24 to the beam branching device 1 is connected to the connector 15. A process fiber 12 for allowing a laser beam to propagate from the beam branching device 1 to each machining head 25 (the first, second, third, and fourth machining heads 25-1, 25-2, 25-3, and 25-4) is connected to each connector 16. Furthermore, an absorber 17 for absorbing the laser beam is attached to a right side surface (the right side surface in FIG. 1) of the housing 19.

Moreover, a collimator lens system 13 for converting the laser beam supplied from the feed fiber 11 into the housing 19 to parallel light is disposed in the housing 19 near the connector 15. Moreover, four focusing lens systems 14 for collecting the laser beam supplied from the housing 19 to the process fiber 12 are disposed in the housing 19 near the four connectors 16. Furthermore, a fixed reflection mirror 18 that reflects the laser beam converted to a parallel light by the collimator lens system 13 to guide the laser beam toward the absorber 17 is disposed in the housing 19.

The optical-path-switching optical system 30 is provided in the housing 19. The beam branching device 1 rotates the rotation shaft of the rotary motor 2 to rotate the rotating member 4 together with the plurality of reflection mirrors 5 using the optical-path-switching optical system 30 so that an incident beam 7 is reflected from the reflection mirror surface portion 20 of any one of the plurality of reflection mirrors 5, the incident beam 7 is branched to a plurality of directions, and an optical path of the reflection beam 9 is switched.

Moreover, in the optical-path-switching optical system 30, the central axis 6 of the rotating member 4 is at a skewed position in relation to the central line 8 of the incident beam 7, and the plurality of reflection mirrors 5 are disposed at a position on the rotating member so as to face both sides in the axial direction of the rotating member with a position P1 closest to the incident beam 7 interposed therebetween. Here, "being at a skewed position" means a positional relation that two straight lines (in this example, the central axis of the rotating member and the central line 8 of the incident beam 7) are not present on the same plane (that is, two straight lines do not intersect and are not parallel to each other) as defined in mathematics (solid geometry).

Since the beam branching device 1 has the above-described configuration, when a laser beam is supplied from the laser apparatus 24 to an arbitrary machining head 25 using the beam branching device 1 to perform laser machining, the optical path of the reflection beam 9 is switched according to the following procedure.

First, before laser machining is performed, as illustrated in FIGS. 3A to 3D, a state in which the incident beam 7 passes obliquely between the reflection mirrors 5 and is not reflected from the reflection mirror surface portion 20 of any reflection mirror 5 is created. In this state, the incident beam 7 is absorbed by the absorber 17 without interfering with any portion of the optical-path-switching optical system 30.

When laser machining is performed using the first machining head 25-1, the rotation shaft of the rotary motor 2 is rotated by 72° in a positive direction (a counterclockwise direction when seen from the distal end side of the rotation shaft) from this state. By doing so, the rotating member 4 rotates by the same angle (72°) in the same direction, and as illustrated in FIGS. 4A to 4D, a state in which the incident beam 7 is incident on the reflection mirror surface portion 20-1 of the first reflection mirror 5-1 is created. As a result, the incident beam 7 which has been absorbed in the absorber 17 is reflected from the reflection mirror surface portion 20-1 of the first reflection mirror 5-1 and is supplied to the first machining head 25-1 as the reflection beam 9. Therefore, it is possible to perform laser machining using the first machining head 25-1. In this case, since the incident beam 7 incident on the reflection mirror surface portion 20-1 of the first reflection mirror 5-1 and the reflection beam 9 reflected from the reflection mirror surface portion 20-1 of the first reflection mirror 5-1 do not interfere with the other reflection mirrors 5 (the second, third, and fourth reflection mirrors 5-2, 5-3, and 5-4), it is possible to perform laser machining using the first machining head 25-1 without any problem.

Moreover, when laser machining is performed using the second machining head 25-2, the rotation shaft of the rotary motor 2 is rotated further by 72° in the positive direction from this state. By doing so, the rotating member 4 is rotated further by the same angle (72°) in the same direction, and as illustrated in FIGS. 5A to 5D, a state in which the incident beam 7 is incident on the reflection mirror surface portion 20-2 of the second reflection mirror 5-2 is created. As a result, the incident beam 7 which has been reflected from the reflection mirror surface portion 20-1 of the first reflection mirror 5-1 is reflected from the reflection mirror surface portion 20-2 of the second reflection mirror 5-2 and is supplied to the second machining head 25-2 as the reflection beam 9. Therefore, it is possible to perform laser machining using the second machining head 25-2. In this case, since the incident beam 7 incident on the reflection mirror surface portion 20-2 of the second reflection mirror 5-2 and the reflection beam 9 reflected from the reflection mirror surface portion 20-2 of the second reflection mirror 5-2 do not interfere with the other reflection mirrors 5 (the first, third, and fourth reflection mirrors 5-1, 5-3, and 5-4), it is possible to perform laser machining using the second machining head 25-2 without any problem.

Moreover, when laser machining is performed using the third machining head 25-3, the rotation shaft of the rotary motor 2 is rotated further by 72° in the positive direction from this state. By doing so, the rotating member 4 is rotated further by the same angle (72°) in the same direction, and as illustrated in FIGS. 6A to 6D, a state in which the incident beam 7 is incident on the reflection mirror surface portion 20-3 of the third reflection mirror 5-3 is created. As a result, the incident beam 7 which has been reflected from the reflection mirror surface portion 20-2 of the second reflection mirror 5-2 is reflected from the reflection mirror surface portion 20-3 of the third reflection mirror 5-3 and is supplied to the third machining head 25-3 as the reflection beam 9. Therefore, it is possible to perform laser machining using the third machining head 25-3. In this case, since the incident beam 7 incident on the reflection mirror surface portion 20-3 of the third reflection mirror 5-3 and the reflection beam 9 reflected from the reflection mirror surface portion 20-3 of the third reflection mirror 5-3 do not interfere with the other reflection mirrors 5 (the first, second, and fourth reflection mirrors 5-1, 5-2, and 5-4), it is possible to perform laser machining using the third machining head 25-3 without any problem.

Moreover, when laser machining is performed using the fourth machining head 25-4, the rotation shaft of the rotary motor 2 is rotated further by 72° in the positive direction from this state. By doing so, the rotating member 4 is rotated further by the same angle (72°) in the same direction, and as illustrated in FIGS. 7A to 7D, a state in which the incident beam 7 is incident on the reflection mirror surface portion 20-4 of the fourth reflection mirror 5-4 is created. As a result, the incident beam 7 which has been reflected from the reflection mirror surface portion 20-3 of the third reflection mirror 5-3 is reflected from the reflection mirror surface portion 20-4 of the fourth reflection mirror 5-4 and is supplied to the fourth machining head 25-4 as the reflection beam 9. Therefore, it is possible to perform laser machining using the fourth machining head 25-4. In this case, since the incident beam 7 incident on the reflection mirror surface portion 20-4 of the fourth reflection mirror 5-4 and the reflection beam 9 reflected from the reflection mirror surface portion 20-4 of the fourth reflection mirror 5-4 do not interfere with the other reflection mirrors 5 (the first, second, and third reflection mirrors 5-1, 5-2, and 5-3), it is possible to perform laser machining using the fourth machining head 25-4 without any problem.

When the rotation shaft of the rotary motor 2 is rotated further by 72° in the positive direction from this state, since the rotation shaft of the rotary motor 2 makes one round (rotates by 360°), the state returns to the state before laser machining is performed (the state of FIGS. 3A to 3D).

As described above, in the beam branching device 1, since one rotary motor 2 includes a plurality of reflection mirrors 5, it is possible to suppress an increase in the cost, the size, and the like of the beam branching device 1 even when the number of branching directions of the incident beam is large. Moreover, since the reflection mirror surface portion 20 of the reflection mirror 5 is approximately perpendicular to the central axis of the rotating member, it is possible to increase the coupling efficiency even when the rotation accuracy of the rotary motor is not increased too high and to cope with high-speed switching of the optical path.

Furthermore, since the central axis of the rotating member that supports the plurality of reflection mirrors 5 and the central line 8 of the incident beam 7 are at skewed positions in relation to each other and a novel design is applied to arrangement of these reflection mirrors 5, it is possible to reduce the size and the weight of the optical-path-switching optical system 30 and the entire beam branching device 1 while increasing the distance between the reflection mirror surface portions 20 of the plurality of reflection mirrors 5 in order to secure the distance between switched laser beams necessary for arranging the focusing lens system.

Moreover, the optical-path-switching optical system 30 is configured so that, when the plurality of reflection mirrors 5 are positioned at predetermined angular positions by rotation of the rotating member, approximately the entire incident beam 7 is reflected from the reflection mirror surface portion 20 of any one of these reflection mirrors 5. Therefore, it is possible to effectively utilize the incident beam 7 and to reduce the size and the weight of the optical-path-switching optical system 30.

The beam branching device 1 is configured so that, when the central line 8 of the incident beam 7 is virtually moved along a direction parallel to a shortest segment that connects the central axis of the rotating member and the central line 8 of the incident beam 7 so as to intersect the central axis of the rotating member, a virtual intersection angle between the central axis of the rotating member and the central line 8 of the incident beam 7 is approximately 45°.

Therefore, it is possible to reduce the size and the weight of the optical-path-switching optical system 30. This is based on the following idea. That is, the smaller the virtual intersection angle, the more the distance between the reflection mirror surface portions 20 of the reflection mirrors 5 needs to be separated in order to secure the distance between the reflection beams 9 necessary for arranging the focusing lens system. In contrast, the larger the virtual intersection angle, the farther the position of the reflection mirror surface portion 20 of the reflection mirror 5 needs to be provided from the central axis of the rotating member. In any case, the size of the optical-path-switching optical system 30 increases. Therefore, the size of the optical-path-switching optical system 30 can be minimized when the virtual intersection angle is approximately 45°.

Furthermore, in the optical-path-switching optical system 30, it is preferable to allow the incident beam 7 to be incident so that the distance between two intersections of the central line 8 of the incident beam 7 and extension planes the reflection mirror surface portions 20 of outermost two reflection mirrors 5 (the first and fourth reflection mirrors 5-1 and 5-4) among the plurality of reflection mirrors 5 is decreased as much as possible. When the intervals between the respective extension planes of the reflection mirror surface portions 20 of the plurality of reflection mirrors 5 are equal and the virtual intersection angle is θ, the distance (d) between two intersections of the central line 8 of the incident beam 7 and the extension planes of the reflection mirror surface portions 20 of the outermost two reflection mirrors 5 is expressed by d=(interval between central lines 10 of the branched reflection beams 9)×((number of reflection mirrors 5)−1)/sin(2θ). Therefore, when the interval between the central lines 10 of the branched reflection beams 9 and the number of reflection mirrors 5 are determined, the distance (d) is the smallest when θ=45°. Therefore, from this respect, it is also preferable to set the virtual intersection angle to approximately 45°.

Figure 8:
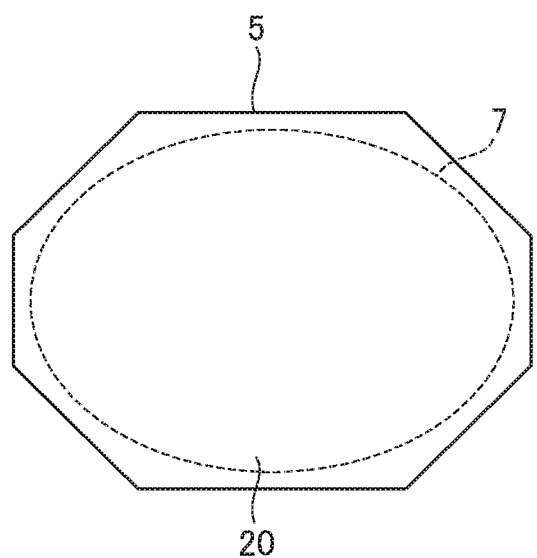
FIG. 8 is a diagram illustrating the shape of a reflection mirror surface portion of a reflection mirror.

Furthermore, as illustrated in FIG. 8, the reflection mirror surface portion 20 of each reflection mirror 5 is formed in an elliptical shape or a polygonal shape (in the present embodiment, an octagonal shape) including this elliptical shape of which the major axis is approximately identical to the line of intersection of a reflection plane (the surface of the reflection mirror surface portion 20) of the incident beam 7 and an incidence plane (a plane including the central line 8 of the incident beam and the central line 10 of the reflection beam) of the incident beam 7 when the incident beam 7 is reflected from the reflection mirror surface portion 20 and of which the ellipticity (the ratio of the major diameter to the minor diameter, a value obtained by dividing the major diameter by the minor diameter) is approximately √2.

Therefore, when the virtual intersection angle is approximately 45°, it is possible to reduce the size and the weight of the optical-path-switching optical system 30 without increasing the size of the reflection mirror surface portion 20 more than necessary. This is because, when the virtual intersection angle is approximately 45°, since the incident beam 7 is incident on the reflection mirror surface portion 20 at an angle of approximately 45°, the shape necessary for reflecting the entire incident beam 7 is a cross-section obtained by cutting a circular column at an angle of approximately 45° with respect to the axis of the circular column (that is, an elliptical shape having an ellipticity of approximately √2). However, since the cost for machining the column into an elliptical form is high, the machining cost can be lowered by machining the column in a shape which is approximately similar to an elliptical shape and which includes the elliptical shape (for example, a polygonal shape such as an octagonal shape).

The optical-path-switching optical system 30 is configured so that by designing the shape and the arrangement of the reflection mirrors 5 appropriately, even when the incident beam 7 is reflected from the reflection mirror surface portion 20 of any one of the plurality of reflection mirrors 5, the optical paths of the incident beam 7 and the reflection beam 9 are not interfered by the other reflection mirrors 5. Due to this, it is possible to avoid attenuation of a laser beam and a risk that the laser beam leaks to an optical path other than a branching destination.

The optical-path-switching optical system 30 is configured so that by rotating the rotating member appropriately, the incident beam 7 travels in a straight line without being reflected from any of the reflection mirror surface portions 20 of the plurality of reflection mirrors 5.

By doing so, in a state in which a laser beam is emitted from the laser apparatus 24, the incident beam 7 is incident on the absorber 17, the laser beam does not leak outside, and the safety can be secured. Moreover, a structure that branches the incident beam 7 having traveled in a straight line to a subsequent optical-path-switching optical system 30 can be created. In this way, it is possible to increase the number of branching directions.

The plurality of reflection mirrors 5 are configured so that the incident beam 7 is not irradiated to a portion other than the reflection mirror surface portion 20 regardless of the rotation angle of the rotating member. Therefore, it is possible to avoid a damage to an irradiated member and a risk that a stray light reflected in an unexpected direction leaks outside the beam branching device 1.

In the optical-path-switching optical system 30, the center of gravity of all constituent members (specifically, the reflection mirror surface portions 20 and all support members for supporting the reflection mirror surface portions 20 and attaching the same to the rotating member) that are rotated by the rotary motor 2 is substantially on the central axis of the rotating member. As a result, even when the rotating member rotates at a high speed, it is possible to prevent the rotating member from vibrating and to perform high-speed switching without decreasing the coupling efficiency. Moreover, by preventing vibration of the rotating member, it is possible to improve the reliability and the durability of the optical-path-switching optical system 30.

The optical-path-switching optical system 30 is configured so that the rotation angle of the rotating member 4 is controlled on the basis of a command from a numerical controller that controls the laser apparatus 24 that emits the incident beam 7 or a numerical controller that controls the machining head 25 that irradiates the reflection beam 9 to a machining workpiece. Therefore, it is possible to enhance synchronization between switching of the laser beam using the beam branching device 1 and the emission state of the laser beam from the laser apparatus 24 or the position and the attitude of the machining head 25 and to improve the machining speed and the machining accuracy of the laser machining.

Furthermore, in this beam branching device 1, since all connectors 15 and 16 are attached to the same surface (the lower surface in FIG. 1) of the housing 19, the usability of the beam branching device 1 is improved.

Second Embodiment

Figure 9:
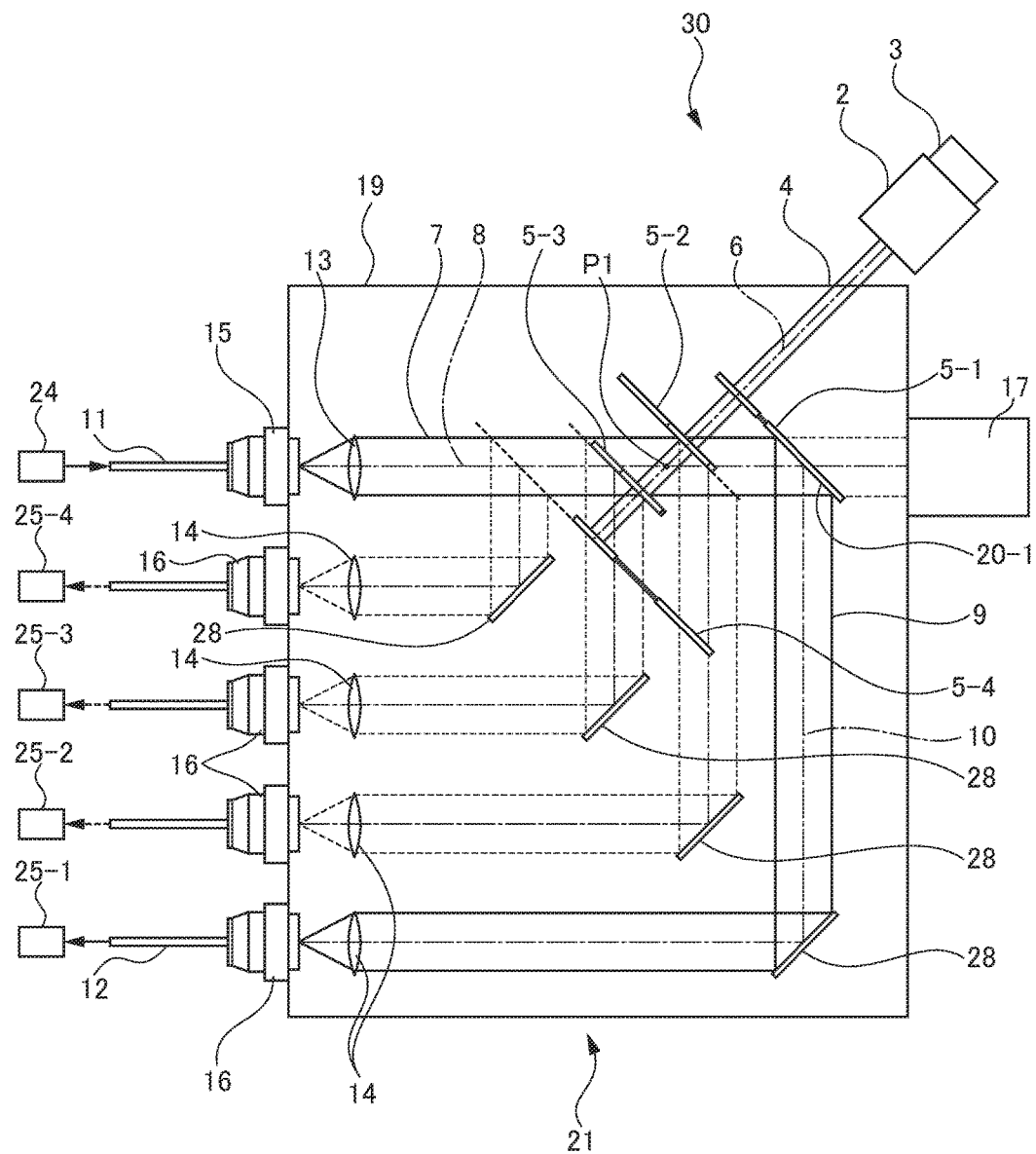
FIG. 9 is a diagram illustrating a configuration of a beam branching device according to a second embodiment.

FIG. 9 is a diagram illustrating a configuration of a beam branching device according to a second embodiment of the present invention.

A beam branching device 21 is different from that of the first embodiment (FIG. 1) in that as illustrated in FIG. 9, the fixed reflection mirror 18 that reflects the incident beam 7 is omitted, and instead of this, four fixed reflection mirrors 28 that reflect branched reflection beams 9 are provided and all connectors 15 and 16 are attached to the same surface (the left side surface in FIG. 9) of the housing 19. The other components are basically similar to those of the first embodiment.

Therefore, the second embodiment provides the same operational effects as those of the first embodiment. In addition to this, in the second embodiment, the positions (the distance to the optical-path-switching optical system 30 in the vertical direction of FIG. 9) of the four fixed reflection mirrors 28 are set appropriately so that the interval between the branched reflection beams 9 can be extended without increasing the size of the optical-path-switching optical system 30.

Furthermore, in this beam branching device 21, since all connectors 15 and 16 are attached to the same surface (the left side surface in FIG. 9) of the housing 19, the usability of the beam branching device 21 is improved.

Third Embodiment

Figure 10:
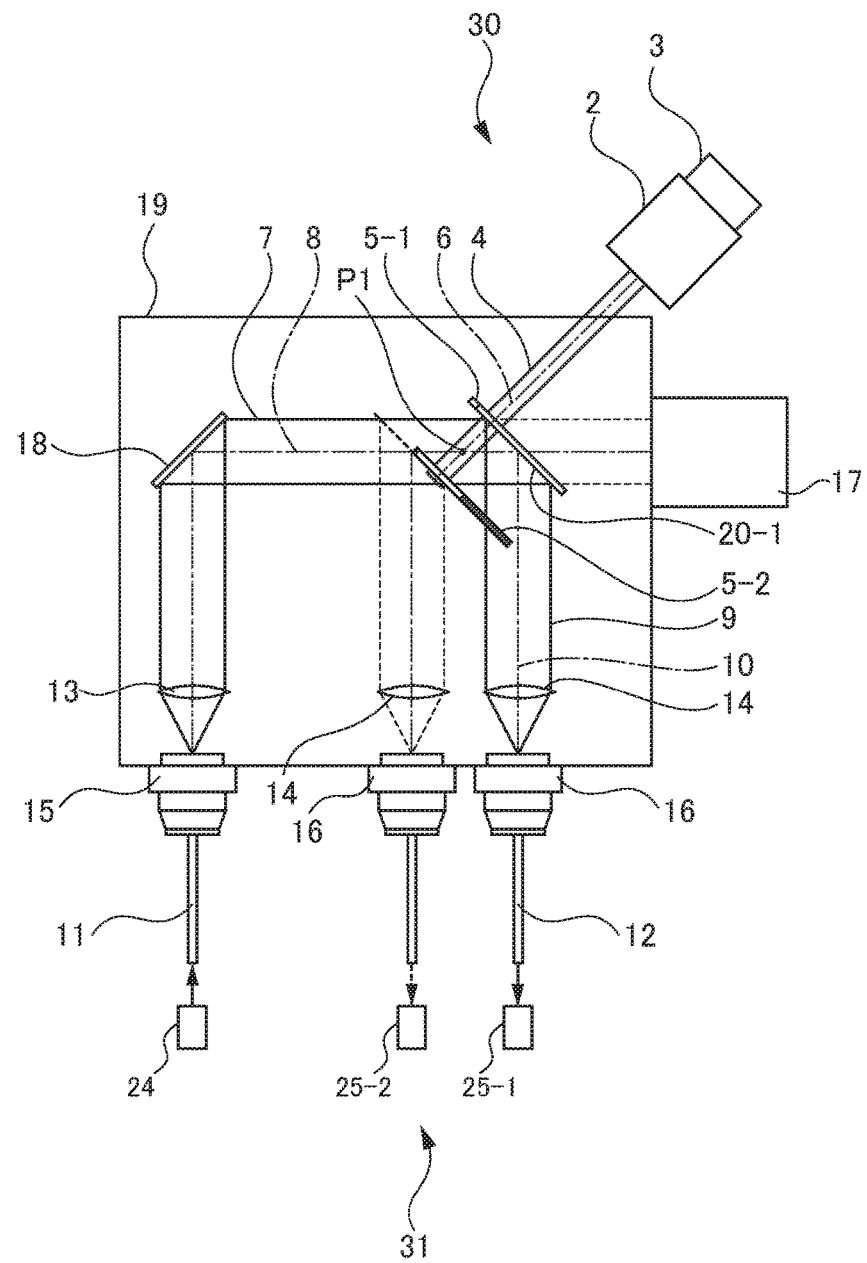
FIG. 10 is a diagram illustrating a configuration of a beam branching device according to a third embodiment.
Figure 11A:
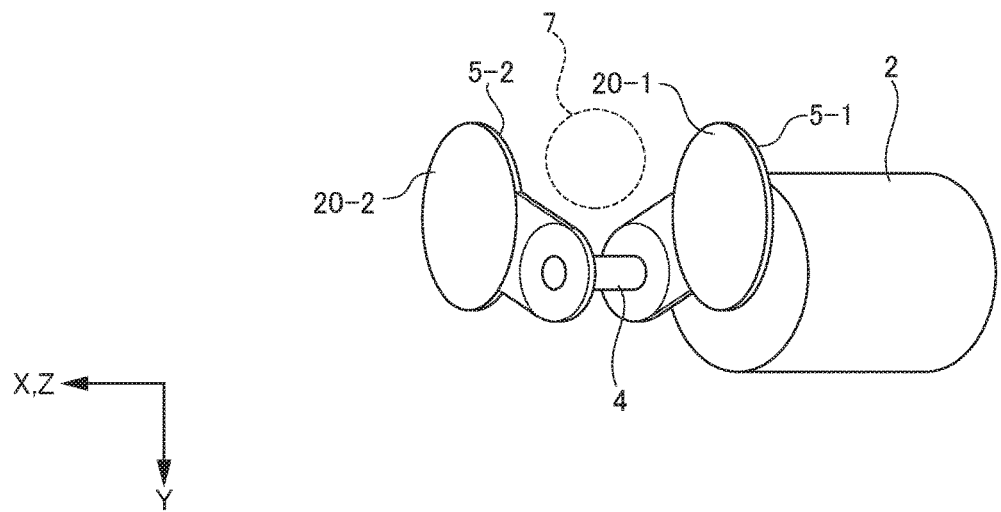
FIG. 11A is a view when an optical-path-switching optical system is seen from an incidence direction of an incident beam in a first case in which the incident beam travels in a straight line without being reflected from any reflection mirror in the beam branching device according to the third embodiment.
Figure 11B:
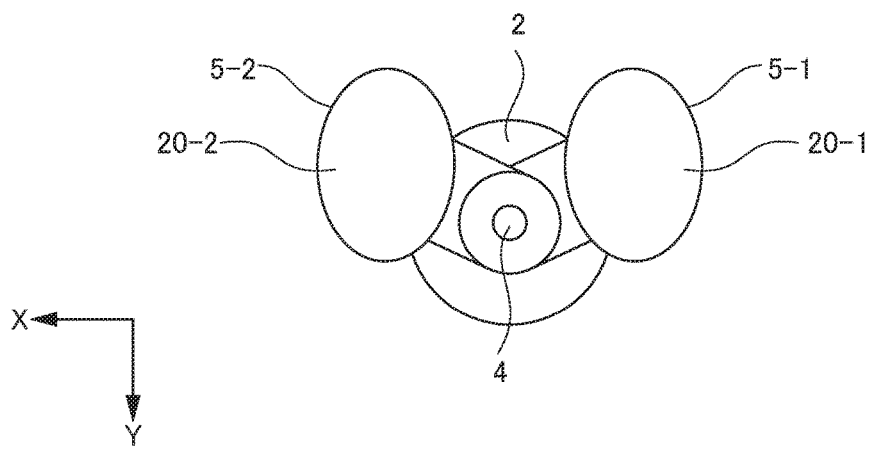
FIG. 11B is a view when
Figure 11C:
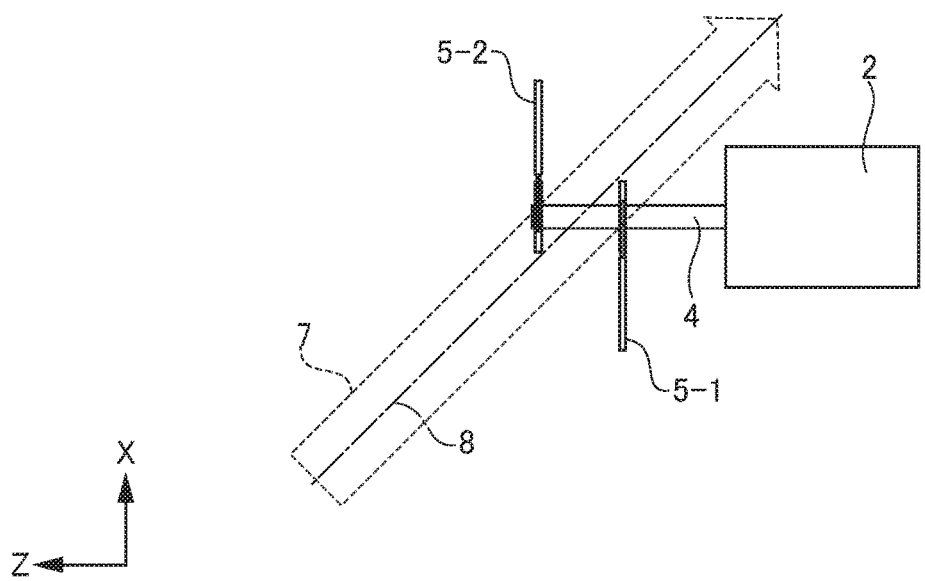
FIG. 11C is a view when
Figure 11D:
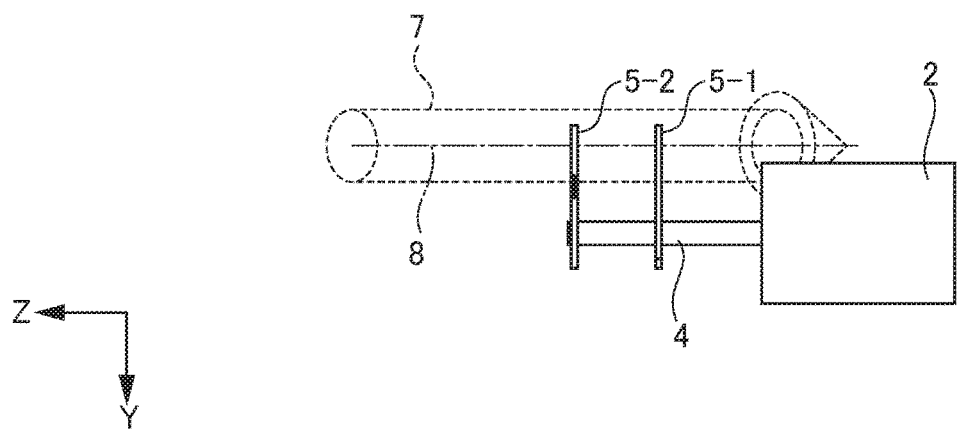
FIG. 11D is a view when
Figure 12A:
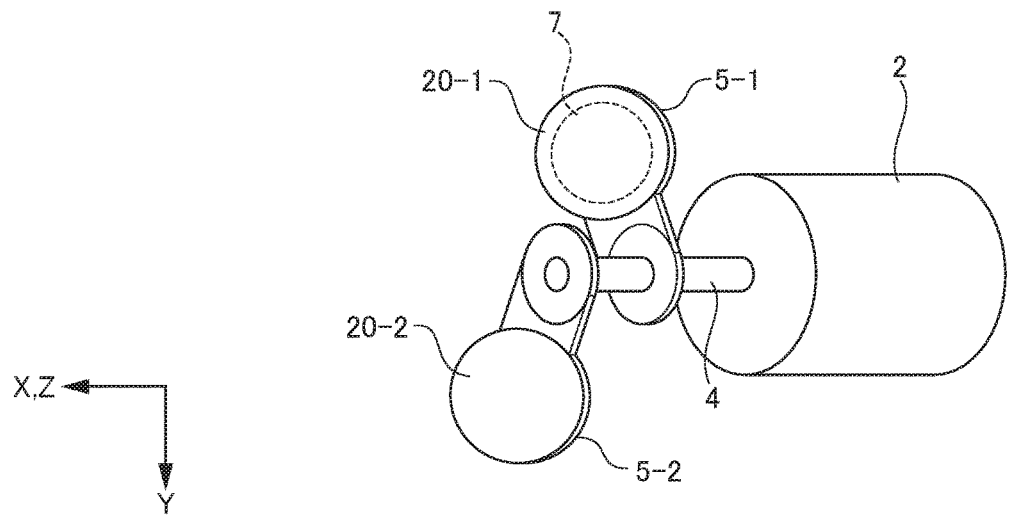
FIG. 12A is a view when an optical-path-switching optical system is seen from an incidence direction of an incident beam when the incident beam is reflected from a first reflection mirror in the beam branching device according to the third embodiment.
Figure 12B:
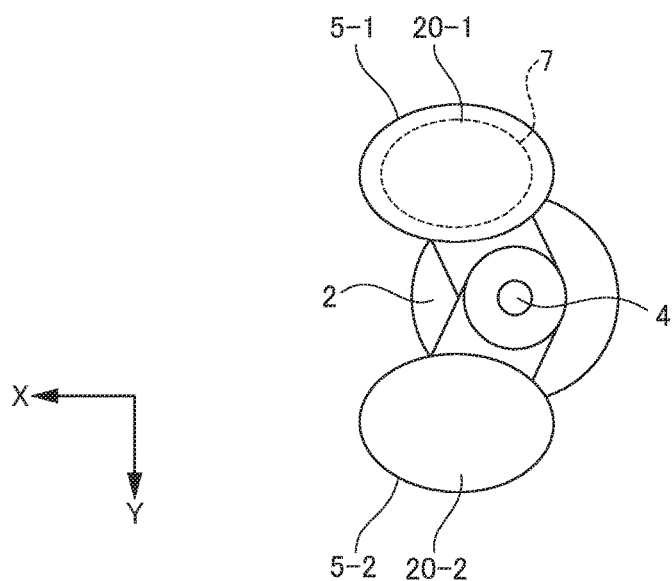
FIG. 12B is a view when
Figure 12C:
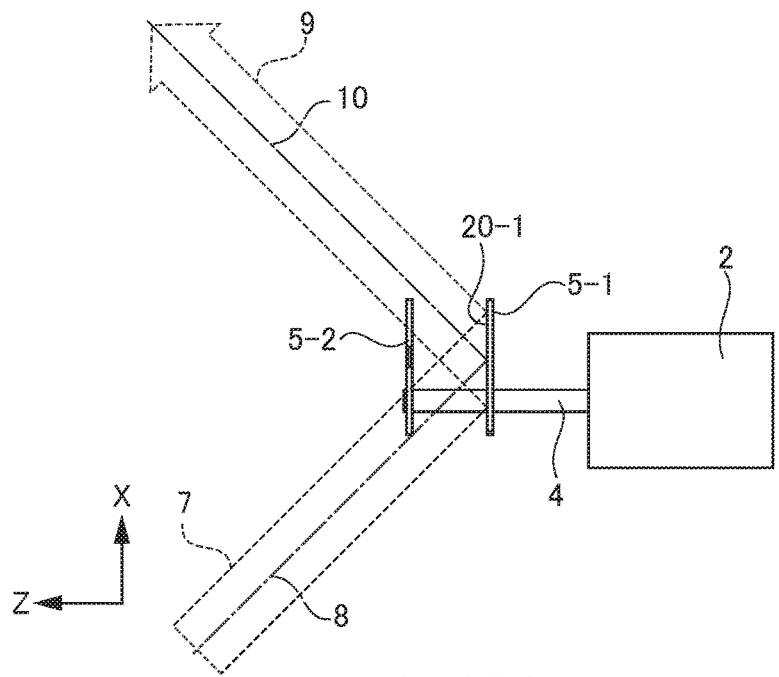
FIG. 12C is a view when
Figure 12D:
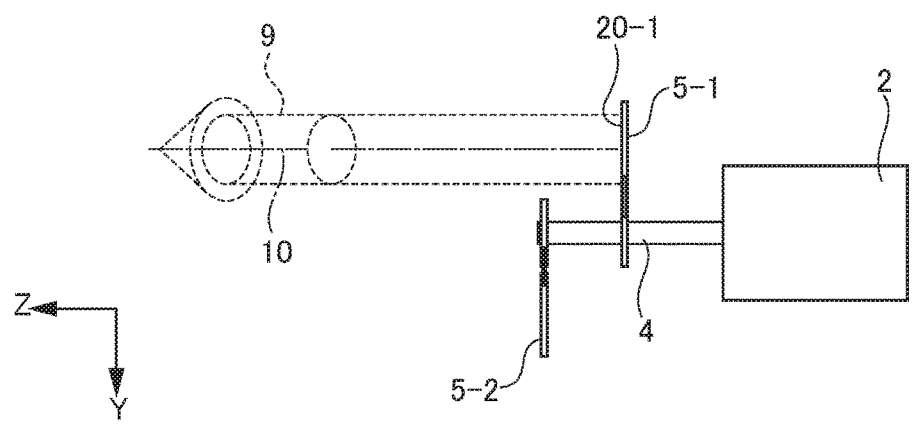
FIG. 12D is a view when
Figure 13A:
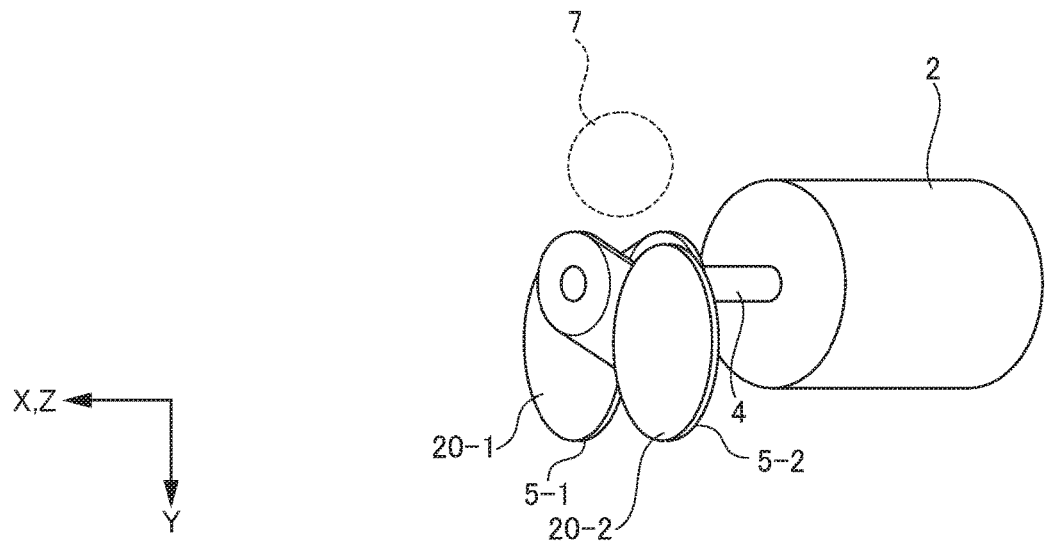
FIG. 13A is a view when an optical-path-switching optical system is seen from an incidence direction of an incident beam in a second case in which the incident beam travels in a straight line without being reflected from any reflection mirror in the beam branching device according to the third embodiment.
Figure 13B:
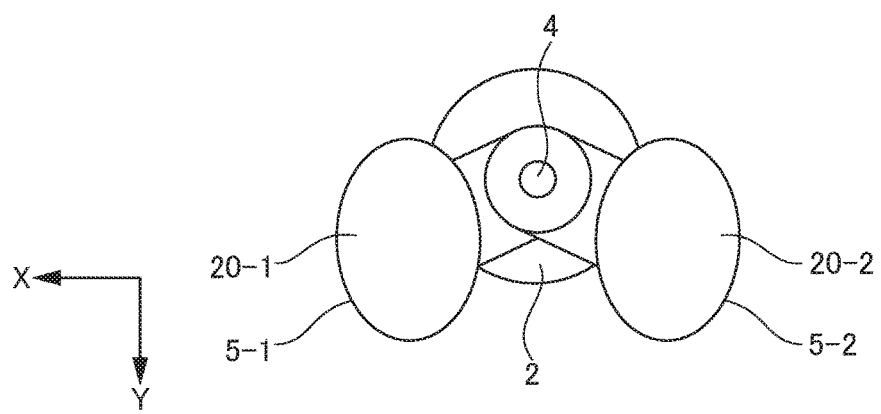
FIG. 13B is a view when
Figure 13C:
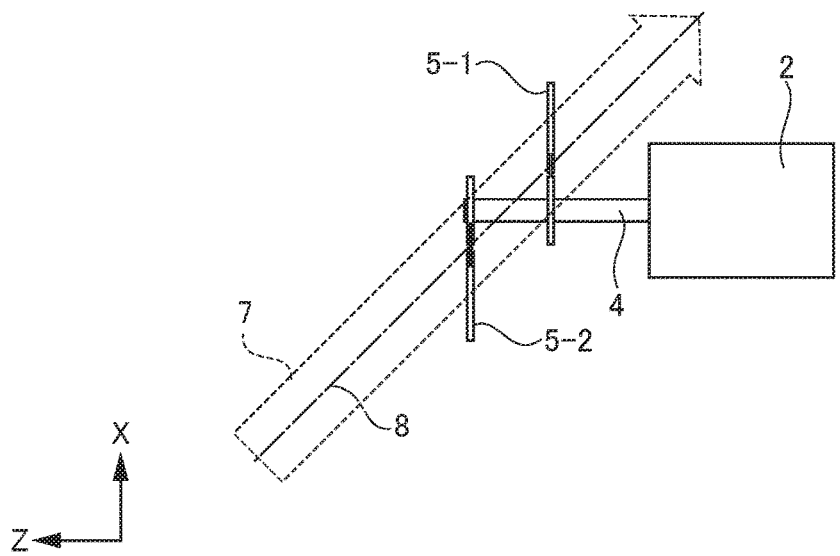
FIG. 13C is a view when
Figure 13D:
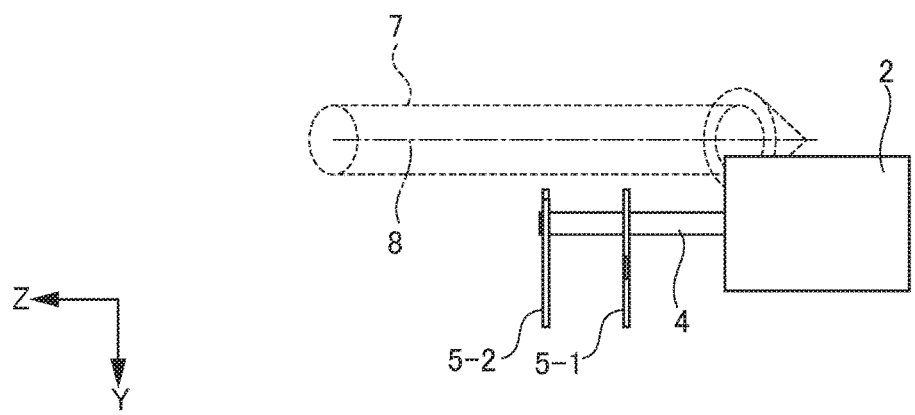
FIG. 13D is a view when
Figure 14A:
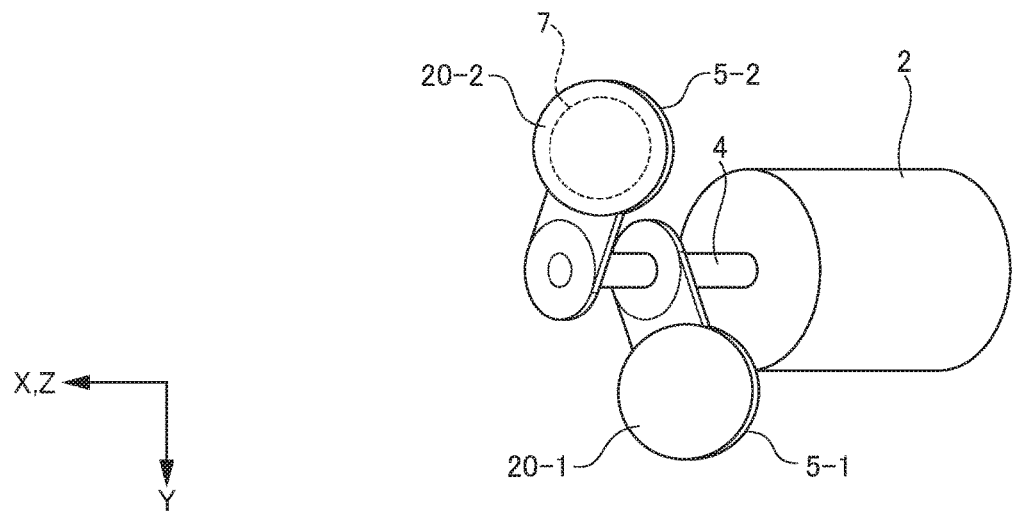
FIG. 14A is a view when an optical-path-switching optical system is seen from an incidence direction of an incident beam when the incident beam is reflected from a second reflection mirror in the beam branching device according to the third embodiment.
Figure 14B:
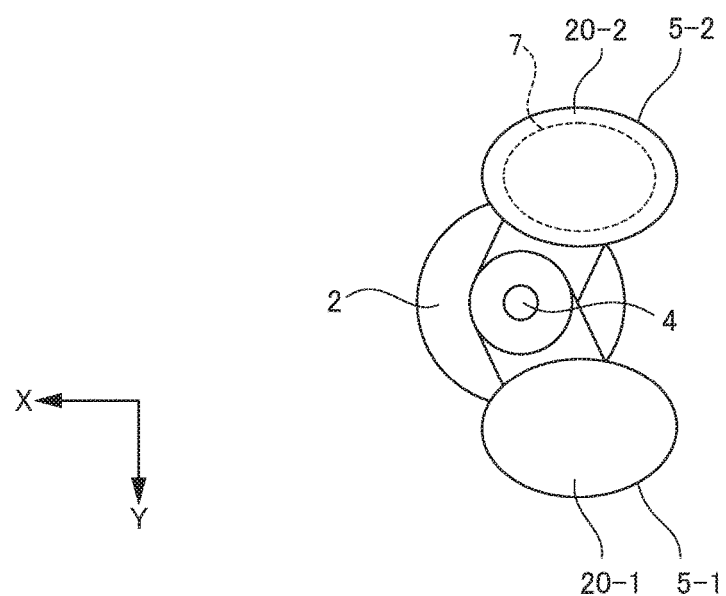
FIG. 14B is a view when
Figure 14C:
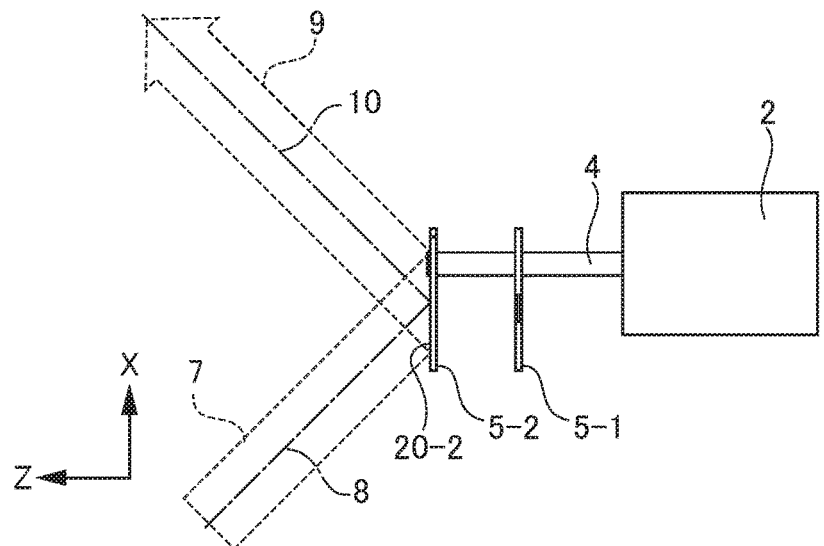
FIG. 14C is a view when
Figure 14D:
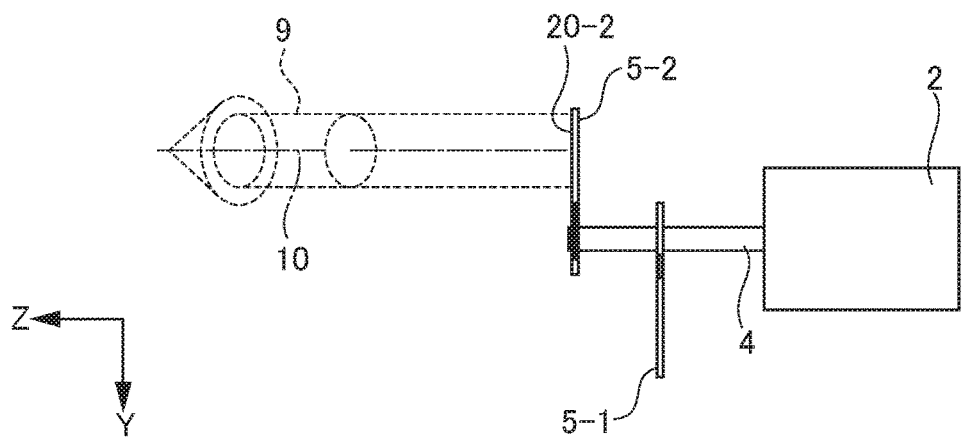
FIG. 14D is a view when

FIG. 10 is a diagram illustrating a configuration of a beam branching device according to a third embodiment of the present invention.

A beam branching device 31 is different from that of the first embodiment (FIG. 1) in that as illustrated in FIG. 10, the number of reflection mirrors 5 attached to the rotating member 4 is reduced from 4 to 2, and the number of branching directions is changed from 5 to 3. Due to this, the reflection mirror surface portions 20 of the two reflection mirrors 5 are arranged at different angles about the central axis 6 of the rotating member 4. The other components are basically similar to those of the first embodiment.

Since the beam branching device 31 has the above-described configuration, when a laser beam is supplied from the laser apparatus 24 to an arbitrary machining head 25 using the beam branching device 31 to perform laser machining, the optical path of the reflection beam 9 is switched according to the following procedure.

First, before laser machining is performed, as illustrated in FIGS. 11A to 11D, a state in which the incident beam 7 passes obliquely between the reflection mirrors 5 and is not reflected from the reflection mirror surface portion 20 of any reflection mirror 5 is created. In this state, the incident beam 7 is absorbed by the absorber 17 without interfering with any portion of the optical-path-switching optical system 30.

When laser machining is performed using the first machining head 25-1, the rotation shaft of the rotary motor 2 is rotated by 90° in a positive direction from this state. By doing so, the rotating member 4 rotates by the same angle (90°) in the same direction, and as illustrated in FIGS. 12A to 12D, a state in which the incident beam 7 is incident on the reflection mirror surface portion 20-1 of the first reflection mirror 5-1 is created. As a result, the incident beam 7 which has been absorbed in the absorber 17 is reflected from the reflection mirror surface portion 20-1 of the first reflection mirror 5-1 and is supplied to the first machining head 25-1 as the reflection beam 9. Therefore, it is possible to perform laser machining using the first machining head 25-1. In this case, since the incident beam 7 incident on the reflection mirror surface portion 20-1 of the first reflection mirror 5-1 and the reflection beam 9 reflected from the reflection mirror surface portion 20-1 of the first reflection mirror 5-1 do not interfere with the other reflection mirror 5 (the second reflection mirror 5-2), it is possible to perform laser machining using the first machining head 25-1 without any problem.

Moreover, when laser machining is performed using the second machining head 25-2, the rotation shaft of the rotary motor 2 is rotated further by 90° in the positive direction from this state. By doing so, the rotating member 4 is rotated further by the same angle (90°) in the same direction, and as illustrated in FIGS. 13A to 13D, a state in which the incident beam 7 passes obliquely between the reflection mirrors 5 and is not reflected from the reflection mirror surface portion 20 of any reflection mirror 5 is created.

Subsequently, the rotation shaft of the rotary motor 2 is rotated further by 90° from this state. By doing so, the rotating member 4 is rotated further by the same angle (90°) in the same direction, and as illustrated in FIGS. 14A to 14D, a state in which the incident beam 7 is incident on the reflection mirror surface portion 20-2 of the second reflection mirror 5-2 is created. As a result, the incident beam 7 which has been absorbed in the absorber 17 is reflected from the reflection mirror surface portion 20-2 of the second reflection mirror 5-2 and is supplied to the second machining head 25-2 as the reflection beam 9. Therefore, it is possible to perform laser machining using the second machining head 25-2. In this case, since the incident beam 7 incident on the reflection mirror surface portion 20-2 of the second reflection mirror 5-2 and the reflection beam 9 reflected from the reflection mirror surface portion 20-2 of the second reflection mirror 5-2 do not interfere with the other reflection mirror 5 (the first reflection mirror 5-1), it is possible to perform laser machining using the second machining head 25-2 without any problem.

When the rotation shaft of the rotary motor 2 is rotated further by 90° in the positive direction from this state, since the rotation shaft of the rotary motor 2 makes one round (rotates by 360°), the state returns to the state before laser machining is performed (the state of FIGS. 11A to 11D).

Therefore, the third embodiment provides the same operational effects as those of the first embodiment. In addition to this, in the third embodiment, the optical-path-switching optical system 30 is configured so that in a period in which an optical path is switched from an arbitrary reflection mirror 5 among the two reflection mirrors 5 (the first and second reflection mirrors 5-1 and 5-2) to the other arbitrary reflection mirror 5, the other reflection mirror 5 does not reflect the incident beam 7. Due to this, since the incident beam 7 is not branched to an optical path other than a switching source and a switching destination during the optical path switching, the safety of the beam branching device 31 is improved. Furthermore, it is possible to shorten the time required for switching the incident beam 7 and to realize high-speed switching.

That is, in the first embodiment (FIG. 1) and the second embodiment (FIG. 9), since four reflection mirrors 5 are attached to the rotating member 4, for example, when laser machining using the first machining head 25-1 transitions to laser machining using the second machining head 25-2, the reflection mirror 5 that reflects the incident beam 7 is switched directly from the first reflection mirror 5-1 to the second reflection mirror 5-2 (that is, without via the third and fourth reflection mirrors 5-3 and 5-4). However, when laser machining using the first machining head 25-1 transitions to laser machining using the third machining head 25-3, it is not possible to switch the reflection mirror 5 that reflects the incident beam 7 directly from the first reflection mirror 5-1 to the third reflection mirror 5-3, but the reflection mirror 5 has to be switched via the second reflection mirror 5-2 (during normal rotation of the rotary motor 2) or the fourth reflection mirror 5-4 (during reverse rotation of the rotary motor 2).

In contrast, in the third embodiment, since two reflection mirrors 5 only are attached to the rotating member 4, when laser machining using the first machining head 25-1 transitions to laser machining using the second machining head 25-2, the reflection mirror 5 that reflects the incident beam 7 is directly switched from the first reflection mirror 5-1 to the second reflection mirror 5-2. Moreover, when laser machining using the second machining head 25-2 transitions to laser machining using the first laser machining 25-1, the reflection mirror 5 that reflects the incident beam 7 is converted directly from the second reflection mirror 5-2 to the first reflection mirror 5-1. Therefore, even when the supply of the incident beam 7 is not stopped temporarily, it is possible to execute high-speed switching of the incident beam 7 while securing the safety of the beam branching device 31.

Fourth Embodiment

Figure 15:
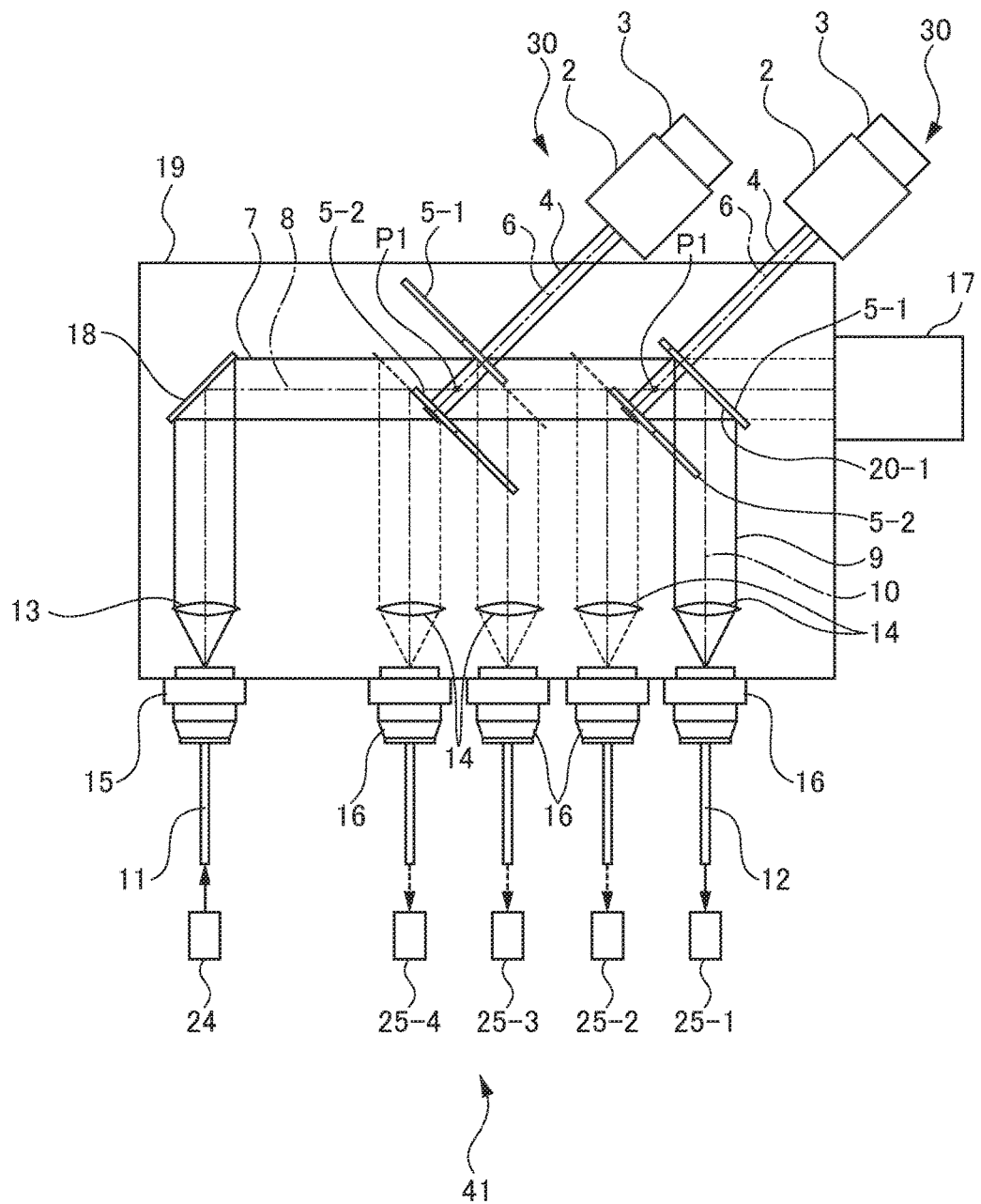
FIG. 15 is a diagram illustrating a configuration of a beam branching device according to a fourth embodiment.

FIG. 15 is a diagram illustrating a configuration of a beam branching device according to a fourth embodiment of the present invention.

A beam branching device 41 is different from that of the first embodiment (FIG. 1) in that as illustrated in FIG. 15, the number of reflection mirrors 5 attached to the rotating member 4 is reduced from 4 to 2 to form the optical-path-switching optical system 30, and two optical-path-switching optical systems 30 are arranged along the optical path of the incident beam 7. In any optical-path-switching optical system 30, the reflection mirror surface portions 20 of the two reflection mirrors 5 are arranged at different angles about the central axis 6 of the rotating member 4 similarly to the third embodiment (FIG. 10). Moreover, the two rotary motors 2 can rotate their rotation shafts independently. The other components are basically similar to those of the first embodiment.

Therefore, the fourth embodiment provides the same operational effects as those of the first embodiment. Moreover, since the rotation shafts of the two rotary motors 2 can be rotated independently, it is possible to execute switching of the incident beam 7 smoothly.

Furthermore, even if the number of branching directions is 5, if the number of reflection mirrors 5 attached to one rotating member 4 is increased to increase the number of branching directions similarly to the first embodiment, the size of the optical-path-switching optical system 30 increases. In contrast, in the fourth embodiment, if the number of rotating members 4 is increased and the number of reflection mirrors 5 attached to one rotating member 4 is decreased, even when the number of branching directions is increased, it is possible to suppress an increase the size of the optical-path-switching optical system 30.

Figure 17:
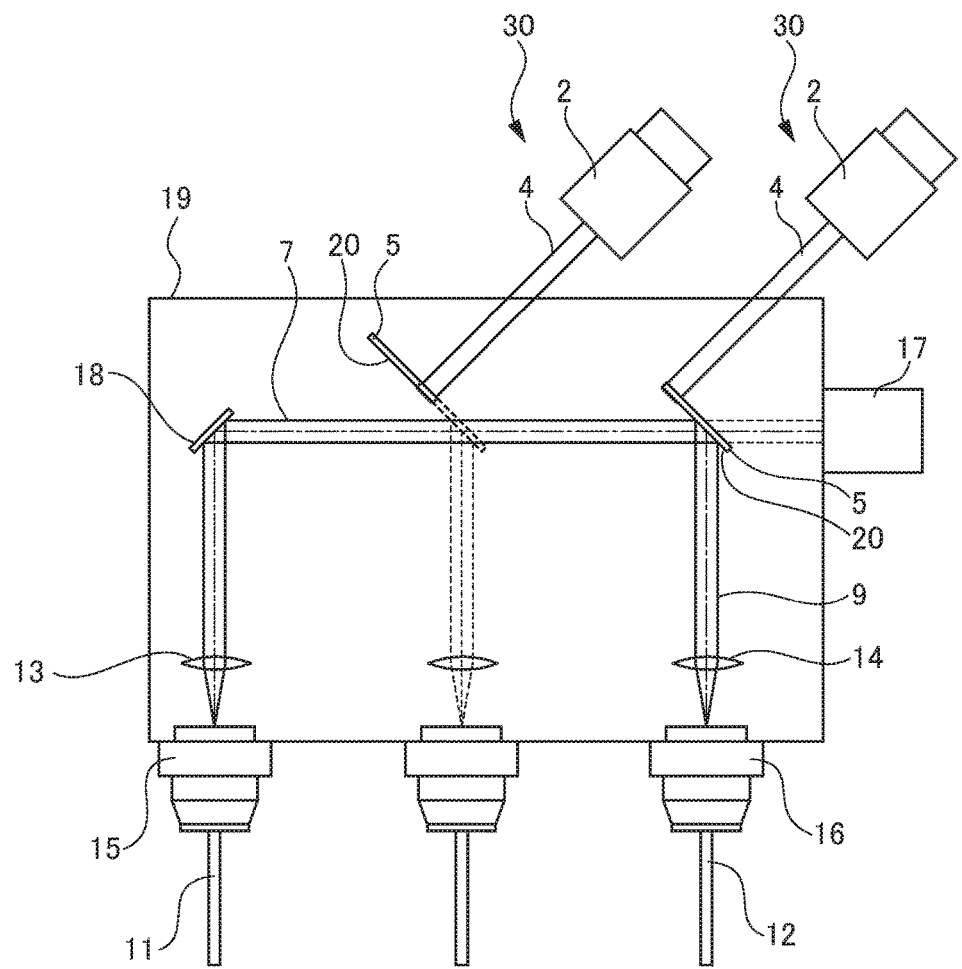
FIG. 17 is a diagram illustrating a configuration of Related Art 1.
Figure 18A:
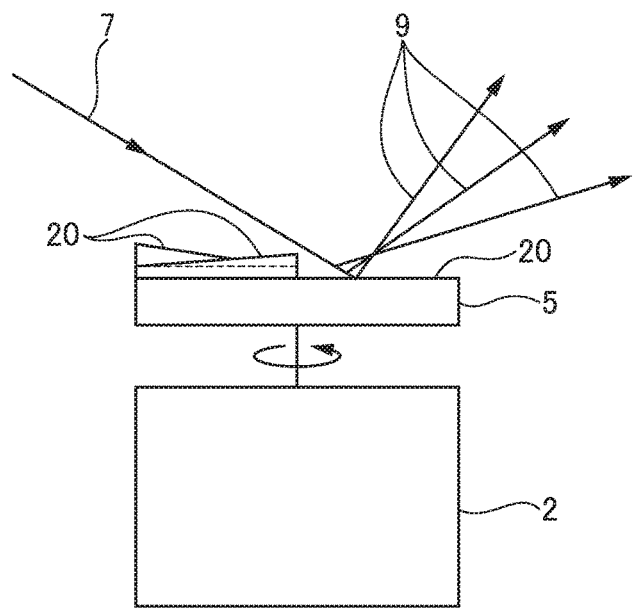
FIG. 18A is a diagram illustrating a configuration of Related Art 2.
Figure 18B:
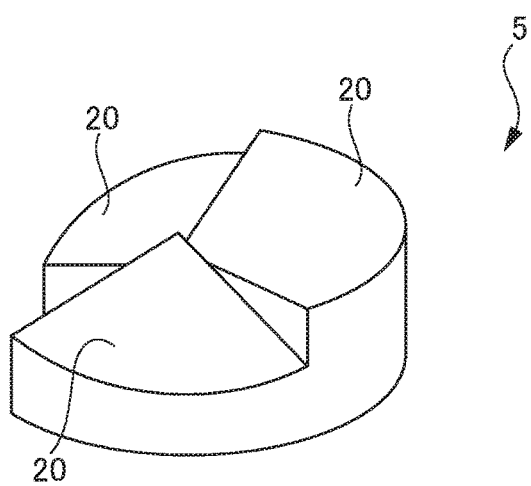
FIG. 18B is a perspective view of a reflection mirror used in Related Art 2.

Although the number of necessary rotary motors 2 in the fourth embodiment is twice that of the first embodiment, the number of necessary rotary motors 2 is half that of the conventional structure (FIG. 17) although the number of branching directions (5) is the same.

Fifth Embodiment

Figure 16:
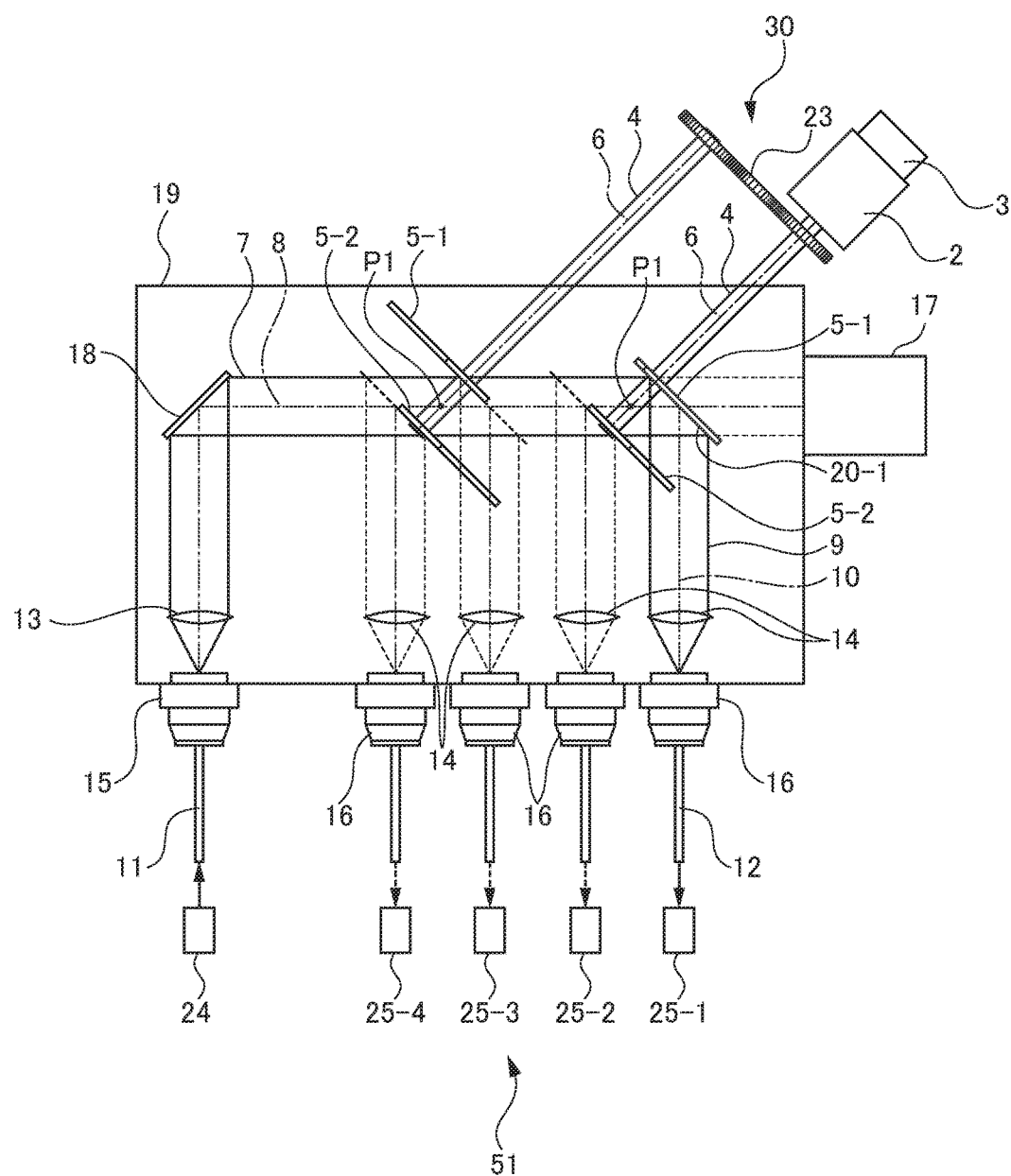
FIG. 16 is a diagram illustrating a configuration of a beam branching device according to a fifth embodiment.

FIG. 16 is a diagram illustrating a configuration of a beam branching device according to a fifth embodiment of the present invention.

A beam branching device 51 is different from that of the fourth embodiment (FIG. 15) in that as illustrated in FIG. 16, one rotary motor 2 and a plurality of rotating members 4 are rotated using a transmission such as a gear. The other components are basically similar to those of the fourth embodiment.

Therefore, the fifth embodiment provides the same operational effects as those of the fourth embodiment. Furthermore, the number of necessary rotary motors 2 is half that of the fourth embodiment although the number of branching directions (5) is the same.

The present invention is not limited to the first to fifth embodiments, and modifications and improvements within a range where the object of the present invention can be achieved fall within the present invention.

In the first to fifth embodiments, although a case in which the rotation shaft of the rotary motor 2 is rotated in a positive direction when switching the optical path of the reflection beam 9 has been described, the rotation shaft of the rotary motor 2 may naturally be rotated in a reverse direction as necessary.

In the first to fifth embodiments, although a case in which the plurality of reflection mirrors 5 are attached to the rotation shaft of the rotary motor 2 so that the attachment angles are shifted in a circumferential direction has been described, the attachment angles of the plurality of reflection mirrors 5 may not necessarily be shifted. That is, when the central axis 6 of the rotating member 4 and the central line 8 of the incident beam 7 are at skewed positions in relation to each other, even if the plurality of reflection mirrors 5 are arranged in the same position in the circumferential direction, it is possible to design such that by rotating the rotating member 4 appropriately, the incident beam 7 is reflected from the reflection mirror surface portion 20 of any one of the plurality of reflection mirrors 5.

In the first to fifth embodiments, a case in which the central axis 6 of the rotating member 4 is identical to or parallel to the central axis of the rotation shaft of the rotary motor 2 has been described. However, the central axis 6 of the rotating member 4 may not necessarily be identical to or parallel to the central axis of the rotation shaft of the rotary motor 2, and for example, the rotation shaft of the rotary motor 2 may be connected to the rotating member 4 by using a coupling member such as a bevel gear or a universal coupling so that these two central axes cross each other.

In the first to fifth embodiments, a structure in which the fixed reflection mirrors 18 and 28 are arranged appropriately in the housing 19 so that a beam incident on the beam branching devices 1, 21, 31, 41, and 51 makes a U-turn and exits from the beam branching devices 1, 21, 31, 41, and 51 is provided. However, the present invention can be applied to a beam branching device in which other structures are added by omitting the fixed reflection mirrors 18 and 28 and changing the direction of the arrangement thereof.

In the first and third to fifth embodiments, the fixed reflection mirror 18 is arranged in the housing 19 in order to change the optical path of the incident beam 7 in the housing 19. In the second embodiment, the fixed reflection mirror 28 is arranged in the housing 19 in order to change the optical path of the reflection beam 9 in the housing 19. However, an optical path switching device such as a prism may be used instead of the fixed reflection mirrors 18 and 28.

In the fourth embodiment, although two optical-path-switching optical systems 30 are used, three or more optical-path-switching optical systems 30 may naturally be used.

In the first to fifth embodiments, although a case in which a laser beam is switched to a plurality of directions has been described, the present invention may naturally be applied to a case in which a beam other than the laser beam is switched to a plurality of directions.

EXPLANATION OF REFERENCE NUMERALS

1, 21, 31, 41, 51: Beam branching device
2: Rotary motor
4: Rotating member
5, 5-1, 5-2, 5-3, 5-4: Reflection mirror
6: Central axis of rotating member
7: Incident beam
8: Central line of incident beam
9: Reflection beam
10: Central line of reflection beam
20, 20-1, 20-2, 20-3, 20-4: Reflection mirror surface portion
24: Laser apparatus
25, 25-1, 25-2, 25-3, 25-4: Machining head
30: Optical-path-switching optical system

What is claimed is:

1. A beam branching device comprising:
a rotary motor;
a rotating member that rotates with a rotation shaft of the rotary motor; and
an optical-path-switching optical system including a plurality of reflection mirrors attached to the rotating member so as to be spaced in an axial direction of the rotating member, the reflection mirror having a reflection mirror surface portion that is approximately perpendicular to a central axis of the rotating member, wherein
the rotation shaft of the rotary motor is rotated to rotate the rotating member together with the plurality of reflection mirrors so that an incident beam is reflected from the reflection mirror surface portion of any one of the plurality of reflection mirrors and the incident beam is branched to a plurality of directions to switch an optical path of a reflection beam, and
the optical-path-switching optical system is arranged so that the central axis of the rotating member is at a skewed position in relation to a central line of the incident beam, and the plurality of reflection mirrors are arranged at a position on the rotating member to face both sides in an axial direction of the rotating member with a position closest to the incident beam interposed therebetween.

2. The beam branching device according to claim 1, wherein
the optical-path-switching optical system is configured so that, when the plurality of reflection mirrors are positioned at predetermined angular positions by rotation of the rotating member, substantially the entire incident beam is reflected from the reflection mirror surface portion of any one of these reflection mirrors.

3. The beam branching device according to claim 1, wherein
when the central line of the incident beam is virtually moved along a direction parallel to a shortest segment that connects the central axis of the rotating member and the central line of the incident beam so as to intersect the central axis of the rotating member, a virtual intersection angle between the central axis of the rotating member and the central line of the incident beam is approximately 45°.

4. The beam branching device according to claim 3, wherein
each of the reflection mirror surface portions of the reflection mirrors is formed in an elliptical shape or a polygonal shape including the elliptical shape of which the major axis is approximately identical to the line of intersection of an incidence plane and a reflection plane of the incident beam when the incident beam is reflected from the reflection mirror surface portion and of which the ellipticity is approximately $\sqrt{2}$.

5. The beam branching device according to claim 1, wherein
the optical-path-switching optical system is configured so that, even when the incident beam is reflected from the reflection mirror surface portion of any one of the plurality of reflection mirrors, the optical paths of the incident beam and the reflection beam are not interfered with the other reflection mirrors.

6. The beam branching device according to claim 1, wherein
the optical-path-switching optical system is configured so that the incident beam travels in a straight line without being reflected from any reflection mirror surface portion of the plurality of reflection mirrors by rotating the rotating member appropriately.

7. The beam branching device according to claim 1, wherein
the optical-path-switching optical system is configured so that in a period in which an arbitrary reflection mirror among the plurality of reflection mirrors is switched to the other arbitrary reflection mirror, the other reflection mirrors do not reflect the incident beam.

8. The beam branching device according to claim 1, wherein
the plurality of reflection mirrors are configured so that the incident beam is not irradiated to a portion other than the reflection mirror surface portion regardless of a rotation angle of the rotating member.

9. The beam branching device according to claim 1, wherein
the optical-path-switching optical system is configured so that the center of gravity of all constituent members that are rotated by the rotary motor is substantially on the central axis of the rotating member.

10. The beam branching device according to claim 1, wherein
a plurality of optical-path-switching optical systems is provided along an optical path of the incident beam.

11. The beam branching device according to claim 1, wherein
the optical-path-switching optical system is configured so that a rotation angle of the rotating member is controlled on the basis of a command from a numerical controller that controls a laser apparatus that emits the incident beam or a numerical controller that controls a machining head that irradiates the reflection beam to a machining workpiece.

* * * * *